US008255970B2

(12) United States Patent
Hatakeyama et al.

(10) Patent No.: US 8,255,970 B2
(45) Date of Patent: Aug. 28, 2012

(54) PERSONAL INFORMATION DISTRIBUTION MANAGEMENT SYSTEM, PERSONAL INFORMATION DISTRIBUTION MANAGEMENT METHOD, PERSONAL INFORMATION SERVICE PROGRAM, AND PERSONAL INFORMATION UTILIZATION PROGRAM

(75) Inventors: Makoto Hatakeyama, Minato-ku (JP); Hidehito Gomi, Minato-ku (JP); Shigeru Hosono, Minato-ku (JP); Satoru Fujita, Minato-ku (JP)

(73) Assignee: NEC Corporation, Tokyo (JP)

( * ) Notice: Subject to any disclaimer, the term of this patent is extended or adjusted under 35 U.S.C. 154(b) by 1355 days.

(21) Appl. No.: 11/450,391

(22) Filed: Jun. 12, 2006

(65) Prior Publication Data

US 2006/0294024 A1    Dec. 28, 2006

(30) Foreign Application Priority Data

Jun. 10, 2005    (JP) ................................ 2005-171329

(51) Int. Cl.
*G06F 17/00*    (2006.01)
*G06F 21/00*    (2006.01)
*G06F 7/04*    (2006.01)
*G06F 17/30*    (2006.01)
*H04L 29/06*    (2006.01)

(52) U.S. Cl. .................... 726/1; 726/2; 726/25; 726/26; 726/27; 705/25; 705/75

(58) Field of Classification Search .................. 726/1, 2, 726/25, 26, 27; 705/75, 25
See application file for complete search history.

(56) References Cited

U.S. PATENT DOCUMENTS

| 7,076,558 B1 * | 7/2006 | Dunn ............................ 709/229 |
| 7,634,484 B2 * | 12/2009 | Murata ................................. 1/1 |
| 2002/0087878 A1 * | 7/2002 | Ballen et al. .................. 713/201 |
| 2002/0095429 A1 * | 7/2002 | Song et al. ................. 707/104.1 |
| 2002/0104015 A1 * | 8/2002 | Barzilai et al. ................ 713/201 |
| 2004/0083243 A1 * | 4/2004 | Feng et al. .................... 707/203 |

(Continued)

FOREIGN PATENT DOCUMENTS

JP    2000-48076 A    2/2000

(Continued)

OTHER PUBLICATIONS

Yamamoto, Taro et al., "Access Controlled Information Sharing for the Distributed Medical Information System", NTT Cyber Space Laboratories, Nov. 9, 2000, pp. 19-24.

*Primary Examiner* — Christian LaForgia
*Assistant Examiner* — Kari Schmidt
(74) *Attorney, Agent, or Firm* — Sughrue Mion, PLLC

(57) ABSTRACT

A personal information generation apparatus 1 encapsulates personal information together with a transmission policy to generate a personal information capsule which is transmitted to personal information utilization apparatus 2. Personal information utilization apparatus 2 receives and holds the personal information capsule for utilization. In this event, personal information generation apparatus 1 transmits a transmission policy defined by the personal information producer. Personal information utilization apparatus 2 in turn transmits a reception policy defined by a personal information user. Then, personal information generation apparatus 1 and personal information utilization apparatus 2 determine a contractual coverage in regard to personal information to be distributed, and generate contract information. Eventually, the personal information is distributed from personal information generation apparatus 1 to personal information utilization apparatus 2 based on the generated contract information.

9 Claims, 13 Drawing Sheets

U.S. PATENT DOCUMENTS

| | | | |
|---|---|---|---|
| 2004/0230601 A1* | 11/2004 | Joao et al. | 707/102 |
| 2005/0097349 A1* | 5/2005 | Watanave et al. | 713/200 |
| 2005/0120076 A1* | 6/2005 | Kamata et al. | 709/203 |
| 2005/0265343 A1* | 12/2005 | Kito et al. | 370/392 |
| 2005/0267847 A1* | 12/2005 | Blechman | 705/75 |
| 2006/0136985 A1* | 6/2006 | Ashley et al. | 726/1 |
| 2006/0247982 A1* | 11/2006 | Stolfo et al. | 705/26 |
| 2009/0254971 A1* | 10/2009 | Herz et al. | 726/1 |

FOREIGN PATENT DOCUMENTS

| | | |
|---|---|---|
| JP | 2003-345931 A | 12/2003 |
| JP | 2004-005583 A | 1/2004 |
| JP | 2004508646 A | 3/2004 |
| JP | 2004-310458 A | 11/2004 |

* cited by examiner

PERSONAL INFORMATION DISTRIBUTION MANAGEMENT SYSTEM, PERSONAL INFORMATION DISTRIBUTION MANAGEMENT METHOD, PERSONAL INFORMATION SERVICE PROGRAM, AND PERSONAL INFORMATION UTILIZATION PROGRAM

BACKGROUND OF THE INVENTION

1. Field of the Invention

The present invention relates to a personal information distribution management system and a personal information distribution management method for managing distributions of personal information, and more particularly, to a personal information distribution management system and a personal information distribution management method which allow personal information to be distributed within a limited range in accordance with a personal information management policy.

The present invention also relates to a personal information service apparatus and a personal information service program for providing personal information. The present invention further relates to a personal information utilization apparatus and a personal information utilization program for utilizing personal information.

2. Description of the Related Art

Generally, in information distribution management systems, information to be distributed and a management policy for the information are encapsulated together to distribute and manage the information in units of capsules.

Here, the "management policy" refers to a policy which describes a disclosure utilization rule related to information, access right control, distribution range and the like, and is created by an owner (for example, a system manager) who manages the information.

For example, JP-A-2000-048076 describes an example of conventional information distribution management systems for managing information in accordance with a management policy.

The information distribution management system described in JP-A-2000-048076, in distributing digital literary works, describes utilization conditions therefor, controls utilization of the digital literary works, controls utilization of secondary literary works, and manages accountings for the digital literary works.

Also, the information distribution management system described in JP-A-2000-048076 comprises an editor, a ticket server, a distribution center, and a viewer.

In the information distribution management system, the viewer restores encrypted literary work data included in an encapsulated literary work and reproduces the recovered literary work data only when a ticket is acquired.

The information distribution management system described in JP-A-2000-048076, which has the foregoing configuration, operates in the following manner.

The editor encapsulates utilization conditions for each utilization method, and utilization secret information resulting from again encrypting a decryption key for encrypted literary data using a ticket key which differs from one utilization method to another, together with the encrypted literary work data.

The ticket server manages the utilization conditions and ticket keys generated by the editor. The ticket server also issues a ticket including a ticket key when a utilization method is permitted for a request for utilization from a user.

The distribution center manages encapsulated literary works, and transmits an appropriate encapsulated literary work in response to a request for utilization from the user.

The viewer acquires the encapsulated literary work from the distribution center, and also acquires a ticket related to the utilization from the ticket server. The viewer can decrypt encrypted literary work data included in the encapsulated literary work for reproduction only when it acquires an appropriate ticket.

JP-A-2003-345931 in turn describes an example of information distribution management systems for distributing and managing personal information.

The information distribution management system described in JP-A-2003-345931 is intended to protect the privacy of personal information providers and improve convenience for users in regard to the utilization of personal information when information related to individuals is managed and distributed.

The information distribution management system described in JP-A-2003-345931 comprises a personal information service apparatus, a personal information utilization apparatus, a utilization environment certifying authority, and a personal information capsule certifying authority.

In the information distribution management system described in JP-A-2003-345931, the personal information service apparatus encapsulates personal information together with disclosure utilization provision determining means to generate a personal information capsule.

The disclosure utilization provision determining means is generated by the personal information service apparatus based on a utilization environment certificate received from the utilization environment certifying authority.

The utilization environment certificate in turn is generated when the personal information utilization apparatus registers a utilization environment in the utilization environment certifying authority.

A personal information capsule generated by the personal information service device is registered in the personal information capsule certifying authority, such that the personal information capsule certifying authority issues a capsule certificate as required.

The personal information utilization apparatus ascertains the validity of a personal information capsule acquired from the personal information service apparatus with a capsule certificate issued by the personal information capsule certifying authority. Then, the personal information utilization apparatus accesses personal information using the disclosure utilization provision determining means included in the personal information capsule.

The disclosure utilization provision determining means compares utilization environment information associated with the personal information utilization apparatus with a utilization environment certificate supplied from the utilization environment certifying authority to permit the personal information utilization apparatus to access personal information.

Massimo Marchiori, "The Platform for Privacy Preference 1.0 (P3P1.0) Specification," [online], Apr. 16, 2002 [searched on May 30, 2005], on the Internet <URL: http://www.w3.org/TR/2002/REC-P3P-200204 16/>, section 2.2, 2.3, 3.2, 3.3 describes P3P (Platform for Privacy Preferences) planned by W3C (World Wide Web Consortium).

P3P is a standard for describing a privacy policy in order to protect privacy on webs and to exchange information on webs.

P3P is intended to provide services based on agreements between users and service providers on webs such that personal information on users is utilized only for purposes of utilization intended by the users.

In this event, a web site correctly discloses criteria for utilizing personal information (privacy policy), such that a user reads the privacy policy disclosed by the web site to determine whether or not the user should send personal information.

FIG. 1 is an explanatory diagram showing a P3P-based personal information exchange scheme. In the following, a form of negotiations between a P3P-based web browser owned by a user and a web server will be described with reference to FIG. 1.

The user uses a user terminal which has previously installed therein a browser that supports P3P to enable use of the browser. The web server, on the other hand, also holds a P3P policy which supports P3P and has previously described a policy for the type of personal information to be collected, to purpose and extent of utilizing the personal information, and the like. The P3P policy is stored in a location which can be accessed by the web browser on the user terminal.

Also, together with the P3P policy, the web server is provided with a policy reference which describes a correspondence relationship between URI's (Uniform Resource Identifier) of web pages and URI's of P3P policies.

First, the user accesses a web page of the web server using the user terminal. The browser on the user terminal in turn acquires a policy reference corresponding to the web page from the web server (step 1 shown in FIG. 1).

The browser further acquires the P3P policy from the web server (step 2). The browser compares the acquired P3P policy with the user's preferences to confirm whether or not there is a problem in the P3P policy (step 3). When there is no problem, the browser sends personal information to the web server, and accesses the web page (step 4).

On the other hand, if the P3P policy does not comply with the user's preferences, the browser can alert the user when user is allowed to access the web site.

In the conventional information distribution management systems described in JP-A-2000-048076 and JP-A-2003-345931, either the generation apparatus for generating information or the utilization apparatus for utilizing information can present predetermined contract terms for distributing information, and distribute information when the other party agrees on the contents of the contract terms.

However, the information generation apparatus and utilization apparatus cannot mutually present their respective policies and contract terms related to information management and transmission (send), and distribute personal information under agreements based on the mutual policies and contract terms.

Neither do the conventional information distribution management systems described in JP-A-2000-048076 and JP-A-2003-345931 do not either disclose means for controlling the utilization of personal information based on contract terms.

Accordingly, the conventional information distribution management systems have a first problem that apparatuses involved in the distribution of personal information cannot distribute, manage, and utilize personal information taking into consideration of contract information which defines information management, purpose of utilizing information, and distribution range of each apparatus.

In other words, in the conventional information distribution management system, the generation apparatus simply confirms the purpose of utilization and distribution range presented by the utilization apparatus, to which personal information is sent, in regard to the personal information to be sent, and the generation apparatus transmits (sends) the personal information to the utilization apparatus without contract terms being shared by the utilization apparatus and generation apparatus.

Thus, the utilization apparatus, which has received the personal information, cannot confirm whether or not the generation apparatus had appropriately processed the policy presented thereby, resulting in indefinite responsibility for the management of personal information between the generation apparatus and utilization apparatus.

Also, the conventional information distribution management systems described in JP-A-2000-048076 and JP-A-2003-345931 do not have means for confirming contract terms made with the personal information generation apparatus and for holding the result of the confirmation, when the personal information utilizing means in the utilization apparatus extracts personal information from personal information holding means for utilization.

This makes indefinite where responsibility lies in regard to compliance with the contract terms between the personal information utilizing means and the storing means.

Since personal information deeply relates to individuals' privacy, it is desirable to exercise great care in selecting information itself to be distributed and in confirming the purpose of utilizing the information.

It is also desirable to previously come to an agreement between the personal information generation apparatus and the personal information utilization apparatus or between utilization apparatuses in regard to elements of personal information to be communicated therebetween, purpose of utilizing the personal information, range of distribution, and the like, such that the respective apparatuses can appropriately distribute, manage, and utilize personal information with responsibility.

The conventional information distribution management systems described in JP-A-2000-048076 and JP-A-2003-345931 each generate a capsule which includes only an information management policy of the information generation apparatus when information to be distributed is encapsulated.

Accordingly, the information management policy on the generation apparatus side is only taken into consideration, whereas no consideration is given to the policy or the contract terms related to information management and transmission on the information capsule utilization apparatus side.

The conventional information distribution management systems therefore have a second problem in which the apparatus which utilizes and manages personal information cannot manage the distribution of personal information in consideration of policies related to its own information management and transmission, which defines the purpose of utilizing the information, and the like.

Here, the "policies related to information management and transmission" refer to those policies which show rules related to distribution of information, applied by each apparatus only within the apparatus itself.

The personal information utilization apparatus manages personal information based on its own information management policy and contract terms.

Therefore, the personal information utilization apparatus, as long as it is responsible for management, should define a transmission policy by itself, and comply with the defined policy while taking into consideration the contract terms presented by the personal information generation apparatus. For example, even if the personal information generation apparatus widely admits distributions of its personal information in the contract terms, the utilization apparatus could leak individuals' privacies and be a perpetrator by distributing the personal information even within a range admitted by the generation apparatus.

Accordingly, the information utilization apparatus itself must properly manage personal information so as to avoid leakage of individuals' privacies. It is therefore desirable that the utilization apparatus appropriately limits the distribution of personal information based on a transmission policy determined thereby, in addition to the contract terms.

Also, in the information distribution management system described in JP-A-2000-048076, a copy right holder for a digital literary work cannot always manage a policy under which the digital literary work is managed.

It is therefore desirable, when personal information is handled, that not only the personal information generation apparatus has a management policy but also that the personal information utilization apparatus has its own management policy to manage personal information taking into consideration of the management policy of the utilization apparatus as well.

As appreciated from the foregoing, an information distribution management system for distributing information only by taking into consideration of a management policy determined by an information generation apparatus cannot be applied, as it is, to management of distributions of personal information.

Also, in the information distribution management system described in JP-A-2003-345931, the personal information generation apparatus manages information taking into consideration distribution within a predetermined common utilization range based on the management policy of the information generation apparatus included in a personal information capsule.

In other words, the system can just manage information only with a supposed management policy of the information generation apparatus.

Also, as described above, in conventional information distribution management systems, the information generation apparatus and utilization apparatus cannot distribute personal information under agreements based on their mutual policies and contract terms.

Consequently, conventional information distribution management systems have a third problem in which the distribution of personal information cannot be managed taking into consideration policies and contract information related to information management and transmission of each apparatus by reusing existing personal information.

Also, as described above, in the conventional information distribution management systems, the information generation apparatus and utilization apparatus cannot distribute personal information under agreements based on mutual policies and contract terms.

Further, the conventional information distribution management systems only consider the information management policy associated with the generation apparatus, but do not consider the policy and contract terms related to information management and transmission associated with the information capsule utilization apparatus.

Consequently, the conventional information distribution management systems have a fourth problem in which when the personal information generation apparatus or utilization apparatus must transmit personal information managed thereby for a reason other than a request for utilization from a utilization apparatus other than the apparatus itself, the systems cannot manage distribution of personal information by taking into consideration of the policies and contract information related to information management and transmission of each device.

Also, the conventional information distribution management systems do not disclose means for recording whether or not personal information has been appropriately utilized or means for referencing the record.

Consequently, the conventional information distribution management systems have a fifth problem in which an individual himself, who provides personal information, cannot confirm whether or not a utilization apparatus appropriately utilizes the personal information.

SUMMARY OF THE INVENTION

It is therefore an object of the present invention to provide a personal information distribution management system, a personal information service apparatus, a personal information utilization apparatus, a personal information distribution management method, a personal information service program, and a personal information utilization program which are capable of distributing personal information after an agreement has been reached in regard to determination of activities for transmission and reception and selection of personal information to be distributed, based on negotiations conducted between a personal information generation apparatus and utilization apparatus, and utilizing personal information based on the coverage of the agreement.

It is another object of the present invention to provide a personal information distribution management system, a personal information service apparatus, a personal information utilization apparatus, a personal information distribution management method, a personal information service program, and a personal information utilization program which are capable of distributing personal information after a utilization apparatus which manages and utilizes personal information has agreed with apparatuses other than the utilization apparatus itself in regard to determination of activities for transmission and reception and selection of personal information to be distributed through negotiations conducted therebetween based on policies and contract terms related to information management and transmission.

It is a further object of the present invention to provide a personal information distribution management system, a personal information service apparatus, a personal information utilization apparatus, a personal information distribution management method, a personal information service program, and a personal information utilization program which are capable of distributing personal information, when a generation apparatus which generates personal information has previously managed the personal information, after the generation apparatus has agreed with another personal information utilization apparatus in regard to determination of activities for transmission and reception and selection of personal information to be distributed through negotiations conducted therebetween based on policies and contract terms related to information management and transmission, on the premise that the other personal information utilization apparatus is limited to personal information which can be provided by the generation apparatus.

It is a further object of the present invention to provide a personal information distribution management system, a personal information service apparatus, a personal information utilization apparatus, a personal information distribution management method, a personal information service program, and a personal information utilization program which are capable of distributing personal information, when a personal information generation apparatus or utilization apparatus must send personal information managed thereby for a reason other than a request for utilization from a utilization apparatus other than itself, after the generation apparatus has agreed with the utilization apparatus in regard to determination of activities for transmission and reception and selection of personal information to be distributed through negotiations conducted therebetween based on policies and contract terms related to information management and transmission.

It is a further object of the present invention to provide a personal information distribution management system, a personal information service apparatus, a personal information utilization apparatus, a personal information distribution management method, a personal information service program, and a personal information utilization program which permit an individual to confirm whether the utilization apparatus which manages personal information appropriately utilizes the personal information.

A personal information distribution management system according to the present invention comprises a personal information service apparatus (implemented, for example, by personal information generation apparatus 1) for providing personal information, and a personal information utilization apparatus for utilizing personal information, and is characterized in that the personal information utilization apparatus includes reception condition transmission means (implemented, for example, by reception negotiation means 22) for transmitting a reception policy (for example, a personal information reception policy), indicative of reception conditions under which the personal information utilization apparatus receives personal information to the personal information, service apparatus through a communications network, while the personal information service apparatus includes selection condition determination means (implemented, for example, by transmission negotiation means 13) for checking a transmission policy (for example, a personal information transmission policy), indicative of transmission conditions under which personal information is transmitted to the personal information utilization apparatus, against the reception policy received from the personal information utilization apparatus to determine conditions (for example, contract information) for selecting personal information which can be provided to the personal information utilization apparatus, capsule generation means (implemented, for example, by transmission information creation means 15) for encapsulating personal information selected in accordance with the selection conditions determined by the personal information selection* condition determination means together with the selection conditions determined by the selection condition determination means to generate a personal information capsule, and personal information transmission means (implemented, for example, by transmission means 16) for transmitting the personal information capsule generated by the capsule generation means to the personal information utilization apparatus through the communications network.

In the personal information distribution management system, the personal information utilization apparatus may also include reception policy storage means (implemented, for example, by personal information request means 21) for previously storing a reception policy, personal information reception means (implemented, for example, by reception means 24) for receiving the personal information capsule from the personal information service apparatus through the communications network, and personal information capsule preservation means (implemented, for example, by personal information holding means 25) for preserving the personal information capsule received by the personal information reception means, wherein the reception policy transmission means transmits the reception, policy stored in the reception policy storage means to the personal information service apparatus through the communications network.

In the personal information distribution management system, the personal information utilization apparatus may further include availability condition determination means (implemented, for example, by transmission negotiation means 26) for checking utilization conditions (for example, a "utilization policy" which is provided by a provider who acquire personal information, and which describes the terms for personal information used by the provider) under which the personal information utilization apparatus utilizes the personal information against the selection conditions included in the personal information capsule preserved by the personal information capsule preservation means to determine conditions for selecting available information, available information selection means (implemented, for example, by transmission information creation means 28) for selecting personal information included in the personal information capsule in accordance with the selection conditions determined by the availability condition determination means, and personal information utilization means (implemented, for example, by utilization means 293) for utilizing the personal information selected by the available information selection means. The term "utilizing personal information" means that a web server, for example, executes a process for providing a variety of services to the user through the Internet in accordance with a program which implements personal information utilization unit 29.

Another personal information distribution management system comprises a personal information service apparatus for providing personal information, and a personal information utilization apparatus for utilizing personal information, and is characterized in that the personal information service apparatus includes personal information input means for entering personal information to be distributed, policy input means (implemented, for example, by contract information input means 12) for entering a policy (for example, a personal information transmission policy) indicative of provisions related to the distribution of the personal information in accordance with manipulations of a personal information producer, contract information generation means (implemented, for example, by transmission negotiation means 13) for generating contract information for concluding a personal information utilization contract with the personal information utilization apparatus to which the personal information is transmitted, based on the personal information entered through the personal information input means and the policy indicative of the provisions related to the distribution entered through the policy input means, recording means (implemented, for example, by negotiation result recording means 14) for preserving the contract information generated by the contract information generation means, capsule creation means (implemented, for example, by transmission information creation means 15) for encapsulating the personal information together with the contract information to generate a personal information capsule based on the contract information generated by the contract information generation means, and transmission means for transmitting the personal information capsule created by the capsule creation means to the personal information utilization apparatus through a communications network, and the personal information utilization apparatus includes request policy storage means (implemented, for example, by personal information request means 21) for storing a policy (for example, a personal information reception policy) for determining a personal information request coverage, request message transmission means (implemented, for example, by reception negotiation means 22) for transmitting a message (for example, a request message) for concluding a contract with the personal information service apparatus in regard to distribution of information to the personal information service apparatus through the communications network based on the policy stored in the request policy storage means, contract information recording means (implemented, for example, by negotiation result recording means 23) for preserving contract information based on the result of processing performed by the request message transmission means, personal information capsule reception means (implemented, for example, by reception means 24) for receiving a personal information capsule from the personal information service apparatus through the communications network, personal information capsule preservation means (implemented, for example, by personal information holding means 25) for preserving the personal information capsule received by the personal information capsule reception means, checking means (implemented, for example, by transmission negotiation means 26) for checking the contract information included in the personal information capsule in order to confirm limitations (for example, a utilization policy) related to the utilization of personal information, check result recording means (implemented, for example, by negotiation result recording means 27) for preserving the result of the check performed by the checking means, information limitation means (implemented, for example, by transmission information creation means 28) for limiting utilized personal information based on the result of the check performed by the checking means, agreement formation means (implemented, for example, by utilization negotiation means 291) for supplying information related to the utilization of personal information to the checking means to form an agreement with the checking means in regard to the utilization of personal information, processing result recording mean is (implemented, for example, by negotiation result recording means 292) for preserving the result of the processing performed by the agreement formation means, and utilization means for utilizing the personal information included in the personal information capsule.

In the personal information distribution management system, the personal information utilization apparatus may also include transmission policy preservation means (implemented, for example, by transmission policy holding means 201) for preserving a transmission policy for managing forwarding of the personal information capsule, information extraction means (implemented, for example, by information extraction means 203) for extracting information to be forwarded to a destination from among information included in the personal information based on the personal information included in the personal information capsule and the information preserved by the transmission policy preservation means, and limitation information generation means (implemented, for example, by contract checking means 202) for generating information on limitations (for example, an inter-apparatus contract policy) to the utilization of the personal information presented to the destination from the contract information included in the personal information capsule based on the information preserved by the transmission policy preservation means.

In the personal information distribution management system, the personal information service apparatus may also include personal information preservation means (implemented, for example, by personal information holding means 102) for previously preserving personal information entered by a personal information producer, and a policy (for example, a personal information transmission policy) corresponding to the personal information entered by the personal information generator, and information extraction means (implemented, for example, by information extraction means 101) for searching the personal information preservation means to extract personal information and a policy corresponding to the personal information from the personal information preservation means based on a request from the contract information generation means.

In the personal information distribution management system, the personal information service apparatus may further include destination input means for entering a destination (for example, identification information such as an IP address or the like) of personal information in accordance with manipulations of the personal information producer, and the personal information utilization apparatus may further include limitation information storage means (implemented, for example, by information management policy holding means 2001) for previously storing limitation information (for example, an information management policy) indicative of limitations to the reception of personal information, and transmission determination means for determining whether or not the personal information is transferred to a personal information utilization apparatus different from the personal information utilization apparatus to determine a destination to which the personal information is forwarded, wherein the transmission means may transmit the personal information capsule to a destination personal information utilization apparatus entered through the destination input means through the communications network.

In the personal information distribution management system, the personal information utilization apparatus may further include personal information disclosure means (implemented, for example, by held personal information disclosure means 2101) for disclosing a personal information capsule preserved by the personal information capsule preservation means to the personal information service apparatus, and processing result disclosure means (implemented, for example, by utilization result disclosure means 2102) for disclosing the processing result (for example, a personal information utilization history) preserved by the processing result recording means to the personal information service apparatus, wherein the personal information disclosure means may disclose the personal information capsule preserved by the personal information preservation means to the personal information service apparatus by transmitting the personal information capsule to the personal information service apparatus through the communications network, and the processing result disclosure means may disclose the processing result preserved by the processing result recording means to the personal information service apparatus by transmitting the processing result to the personal information service apparatus through the communications network.

A personal information service apparatus according to the present invention, which is a personal information service apparatus for providing personal information in a personal information distribution management system for managing distributions of personal information, is characterized by comprising reception condition reception means for receiving a reception policy indicative of reception conditions under which a personal information utilization apparatus, which utilizes personal information, receives the personal information from the personal information utilization apparatus through a communications network, selection condition determination means for checking a transmission policy, indicative of transmission conditions under which personal information is transmitted to a personal information utilization apparatus, against the reception policy received by the reception condition reception means to determine conditions for selecting personal information which can be provided to the personal information utilization apparatus, capsule generation means for encapsulating personal information selected in accordance with the selection conditions determined by the selection condition determination means together with the selection conditions determined by the selection condition determination means to generate a personal information capsule, and personal information transmission means for transmitting the personal information capsule generated by the capsule generation means to the personal information utilization apparatus through the communications network.

Another personal information service apparatus, which is a personal information service apparatus for providing personal information in a personal information distribution management system for managing distributions of personal information, may comprise personal information input means for entering personal information to be distributed, policy input means for entering a policy indicative of provisions related to the distribution of the personal information in accordance with manipulations of a personal information producer, contract information generation means for generating contract information for concluding a personal information utilization contract with a personal information utilization apparatus to which the personal information is transmitted, based on the personal information entered through the personal information input means and the policy indicative of the provisions related to the distribution entered through the policy input means, recording means for preserving the contract information generated by the contract information generation means, capsule creation means for encapsulating the personal information together with the contract information to generate a personal information capsule based on the contract information generated by the contract information generation means, and transmission means for transmitting the personal information capsule created by the capsule creation means to the personal information utilization apparatus through a communications network.

The personal information service apparatus may also comprise personal information preservation means for previously preserving personal information entered by a personal information producer, and a policy corresponding to the personal information entered by the personal information producer, and information extraction means for searching the personal information preservation means to extract personal information and a policy corresponding to the personal information from the personal information preservation means based on a request from the contract information generation means.

The personal information service apparatus may further comprise destination input means for entering a destination for the personal information in accordance with manipulations of the personal information producer, wherein the transmission means may transmit the personal information capsule to a destination personal information utilization apparatus entered through the destination input means through the communications network.

A personal information utilization apparatus according to the present invention, which is a personal information utilization apparatus for utilizing personal information in a personal information distribution management system for managing distribution of personal information, is characterized by comprising reception policy storage means for previously storing a reception policy, reception policy transmission means for transmitting the reception policy stored in the reception policy storage means to a personal information service apparatus for providing personal information through a communications network, personal information reception means for receiving a personal information capsule from the personal information service apparatus through the communications network, and personal information capsule preservation means for preserving the personal information capsule received by the personal information reception means.

The personal information utilization apparatus may further comprise availability condition determination means for checking utilization conditions under which the personal information utilization apparatus utilizes the personal information against selection conditions included in the personal information capsule preserved by the personal information capsule preservation means to determine conditions for selecting available information, available information selection means for selecting personal information included in the personal information capsule in accordance with the selection conditions determined by the availability condition determination means, and personal information utilization means for utilizing the personal information selected by the available information selection means.

Another personal information utilization apparatus according to the present invention, which is a personal information utilization apparatus for utilizing personal information in a personal information distribution management system for managing distribution of personal information, may comprise request policy storage means for storing a policy for determining personal information request coverage, request message transmission means for transmitting a message for concluding a contract with the personal information service apparatus in regard to distribution to the personal information service apparatus through the communications network based on the policy stored in the request policy storage means, contract information recording means for preserving contract information based on the result of processing performed by the request message transmission means, personal information capsule reception means for receiving a personal information capsule from the personal information service apparatus through the communications network, personal information capsule preservation means for preserving the personal information capsule received by the personal information capsule reception means, checking means for checking contract information included in the personal information capsule in order to confirm limitations related to the utilization of personal information, check result recording means for preserving the result of the check performed by the checking means, information limitation means for limiting utilized personal information based on the result of the check performed by the checking means, agreement formation means for supplying information related to the utilization of personal information to the checking means to form an agreement with the checking means in regard to the utilization of personal information, processing result recording means for preserving the result of the processing performed by the agreement formation means, and utilization means for utilizing the personal information included in the personal information capsule.

The personal information utilization apparatus may also comprise transmission policy preservation means for preserving a transmission policy for managing forwarding of the personal information capsule, information extraction means for extracting information forwarded to a destination from among information included in the personal information based on the personal information included in the personal information capsule and the information preserved by the transmission policy preservation means, and limitation information generation means for generating information on limitations to the utilization of the personal information presented to the destination from the contract information included in the personal information capsule based on the information preserved by the transmission policy preservation means.

The personal information utilization apparatus may further comprise limitation information storage means for previously storing limitation information indicative of limitations to the reception of personal information, and transmission determination means for determining whether or not the personal information is transferred to one personal information utilization apparatus different from another personal information utilization apparatus to determine a destination to which the personal information is forwarded.

The personal information service apparatus may further comprise personal information disclosure means for disclosing a personal information capsule preserved by the personal information capsule preservation means to the personal information service apparatus, and processing result disclosure means for disclosing the processing result preserved by the processing result recording means to the personal information service apparatus, wherein the personal information disclosure means may disclose the personal information capsule preserved by the personal information preservation means to the personal information service apparatus by transmitting the personal information capsule to the personal information service apparatus through the communications network, and the processing result disclosure means may disclose the processing result preserved by the processing result recording means to the personal information service apparatus by transmitting the processing result to the personal information service apparatus through the communications network.

The personal information distribution management method according to the present invention is characterized by including the steps of a personal information utilization apparatus which utilizes personal information that transmits a reception policy indicative of reception conditions under which the personal information utilization apparatus receives personal information to a personal information service apparatus which provides personal information through a communications network, the personal information service apparatus that checks a transmission policy, indicative of transmission conditions under which personal information is transmitted to the personal information utilization apparatus, against the reception policy received from the personal information utilization apparatus to determine conditions for selecting personal information which can be provided to the personal information utilization apparatus, the personal information service apparatus that selects personal information in accordance with the determined selection conditions, and the personal information service apparatus that transmits the selected personal information to the personal information utilization apparatus through the communications network.

Another personal information distribution management method according to the present invention may include the steps of a personal information service apparatus which provides receiving personal information to be distributed, provides the personal information service apparatus for receiving a policy indicative of provisions related to the distribution of the personal information in accordance with manipulations of a personal information producer, provides the personal information service apparatus generating contract information for concluding a personal information utilization contract with a personal information utilization apparatus which utilizes the personal information and to which the personal information is transmitted, based on the entered personal information and the policy indicative of the entered provisions related to the distribution, provides the personal information service apparatus for preserving the generated contract information, the personal information service apparatus for encapsulating the personal information together with the contract information to generate a personal information capsule based on the generated contract information, provides the personal information service apparatus for transmitting the created personal information capsule to the personal information utilization apparatus through a communications network, provides the personal information utilization apparatus for previously storing a policy for determining a personal information request coverage, provides the personal information utilization apparatus for transmitting a message for concluding a contract with the personal information service apparatus in regard to the distribution to the personal information service apparatus through the communications network based on the previously stored policy, provides the personal information utilization apparatus for preserving contract information based on the result of the step of transmitting the message, provides the personal information utilization apparatus for receiving the personal information capsule from the personal information service apparatus through the communications network, provides the personal information utilization apparatus for preserving the received personal information capsule, provides the personal information utilization apparatus for checking the contract information included in the personal information capsule in order to confirm limitations related to the utilization of personal information, provides the personal information utilization apparatus for preserving the result of the step of checking the contract information, provides the personal information utilization apparatus for limiting utilized personal information based on the result of the check, provides the personal information utilization apparatus for supplying information related to the utilization of personal information to form an agreement in regard to the utilization of personal information, provides the personal information utilization apparatus for preserving the result of the step for forming the agreement, and provides the personal information utilization apparatus for utilizing the personal information included in the personal information capsule.

A personal information service program according to the present invention, which is a personal information service program for providing personal information to a personal information utilization apparatus for utilizing the personal information, is characterized by causing a computer to execute processing for receiving a reception policy indicative of reception conditions under which the personal information utilization apparatus receives personal information from the personal information utilization apparatus for utilizing the personal information through a communications network, processing for checking a transmission policy, indicative of transmission conditions under which personal information is transmitted to the personal information utilization apparatus, against the received reception policy to determine conditions for selecting personal information which can be provided to the personal information utilization apparatus, processing for selecting personal information in accordance with the determined selection conditions, and processing for transmitting the selected personal information to the personal information utilization apparatus through the communications network.

The personal information service program may further cause the computer to execute processing for encapsulating the selected personal information together with the determined selection conditions to generate a personal information capsule, and processing for transmitting the generated personal information capsule to the personal information utilization apparatus through the communications network.

Another personal information service program according to the present invention, which is a personal information service program for providing personal information to a personal information utilization apparatus for utilizing the personal information, is characterized by causing a computer to execute processing for entering personal information to be distributed, processing for entering a policy indicative of provisions related to the distribution of the personal information in accordance with manipulations of a personal information producer, processing for generating contract information for concluding a personal information utilization contract with a personal information utilization apparatus which is a destination for personal information, based on the entered personal information and the entered policy indicative of the provisions related to the distribution, processing for preserving the generated contract information, processing for encapsulating the personal information together with the contract information to generate a personal information capsule based on the generated contract information, and processing for transmitting the created personal information capsule to the personal information utilization apparatus through a communications network.

The personal information service program may further cause the computer to execute processing for previously storing the personal information entered by the personal information producer and for storing a policy corresponding to the personal information entered by the personal information producer, and processing for searching preserved personal information and policies to extract personal information and for storing a policy corresponding to the personal information based on a request.

The personal information service program may further cause the computer to execute processing for entering the destination of the personal information in accordance with manipulations of the personal information producer, and processing for transmitting a personal information capsule to a personal information utilization apparatus which is the destination entered through the communications network.

A personal information utilization program according to the present invention, which is a personal information utilization program for acquiring personal information from a personal information service apparatus to utilize the acquired personal information, is characterized by causing a computer comprising reception policy storage means for previously storing reception policies to execute processing for transmitting a reception policy stored in the reception policy storage means to a personal information service apparatus for providing personal information through a communications network, processing for receiving a personal information capsule from the personal information service apparatus through the communications network, and processing for preserving the received personal information capsule.

The personal information utilization program may further cause the computer to execute processing for checking utilization conditions for utilizing personal information against selection conditions included in a preserved personal information capsule to determine conditions for selecting available information, processing for selecting personal information included in the personal information capsule in accordance with the determined selection conditions, and processing for utilizing the selected personal information.

Another personal information utilization program according to the present invention, which is a personal information utilization program for acquiring personal information from a personal information service apparatus to utilize the acquired personal information, may cause a computer comprising request policy storage means for storing a policy for determining a personal information request coverage to execute processing for transmitting a message for concluding a contract with the personal information service apparatus in regard to the distribution to the personal information service apparatus through a communications network based on the policy stored in the request policy storage means, processing for preserving contract information based on the result of the processing for transmitting the message, processing for receiving a personal information capsule from the personal information service apparatus through the communications network, processing for preserving the received personal information capsule, processing for checking contract information included in the personal information capsule in order to confirm limitations related to the utilization of personal information, processing for preserving the result of checking the contract information, processing for limiting utilized personal information based on the result of the check, processing for supplying information related to the utilization of personal information to form an agreement in regard to the utilization of personal information, processing for preserving the result of the processing for performing the agreement, and processing for utilizing personal information included in the personal information capsule.

The personal information utilization program may further cause the computer to execute processing for preserving a transmission policy for managing forwarding of the personal information capsule, processing for extracting information to be forwarded to a destination from among information included in the personal information based on the personal information included in the personal information capsule and the preserved transmission policy, and processing for generating information on limitations to the utilization of the personal information presented to the destination from the contract information included in the personal information capsule based on the preserved transmission policy.

The personal information utilization program may further cause a computer comprising limitation information storage means for previously storing limitation information indicative of limitations to the reception of personal information to execute processing for determining whether or not personal information is forwarded to one personal information utilization apparatus different from another personal information utilization apparatus, and processing for determining a destination to which the personal information is forwarded.

The personal information utilization program may further cause the computer to execute processing for disclosing a preserved personal information capsule to the personal information service apparatus by transmitting the personal information capsule to the personal information service apparatus through the communications network, and processing for disclosing a preserved processing result to the personal information service apparatus by transmitting the processing result to the personal information service apparatus through the communications network.

According to the present invention, the personal information service apparatus and personal information utilization program conduct negotiations for utilizing personal information based on their respective personal information utilization policies. Also, transmission/reception of personal information is determined between the personal information service apparatus and personal information utilization apparatus only when the negotiations result in an agreement established between the apparatuses. It is therefore possible to clarify where the responsibility lies in regard to the management and handling of personal information between the personal information service apparatus and personal information utilization apparatus. Consequently, personal information can be distributed after an agreement is reached in regard to determination of activities involved in the transmission and reception, and selection of personal information to be distributed, and the personal information can be utilized based on the agreement coverage.

Also, according to the present invention, the personal information service apparatus is required not to transmit personal information when it is determined that the transmission of personal information is not appropriate, as a result of negotiations with the personal information utilization apparatus in regard to the transmission of personal information. Accordingly, the personal information service apparatus can reduce the possibility that it gives rise to comprises individual privacy associated with the transmission of personal information to the personal information utilization apparatus.

Further, according to the present invention, the personal information utilization apparatus is required not to receive personal information when it is determined that the reception of personal information is not appropriate, as a result of negotiations with the personal information service apparatus in regard to the reception of personal information. Accordingly, the personal information utilization apparatus can reduce the possibility that it gives rise to improper utilization of personal information and comprises individual privacy associated with the reception of personal information from the personal information utilization apparatus.

Additionally, in the present invention, when personal information is utilized in the personal information utilization apparatus, selection conditions included in a personal information capsule preserved by the personal information capsule preservation means may be checked against utilization conditions under which the personal information utilization apparatus utilizes the personal information to confirm personal information utilization conditions. According to such a configuration, since personal information is utilized only when the conditions are met, responsibility can be clarified between the personal information capsule preservation means and personal information utilization means. Consequently, it is possible to clarify where the responsibility lies in regard to the management and utilization of personal information within the personal information utilization apparatus and to safely distribute and mange the personal information.

Further, in the present invention, when one personal information utilization apparatus other than another personal information service apparatus transmits personal information to another personal information utilization apparatus, negotiations may be conducted in regard to the utilization of personal information between the two personal information utilization apparatuses, and personal information may be forwarded between the personal information utilization apparatuses only when an agreement is established. In the configuration just described, personal information can be automatically distributed for secondary utilization without conducting negotiations with the personal information service apparatus, while considering the information management policy of the personal information service apparatus. It is therefore possible to safely, flexibly, and rapidly distribute personal information between personal information utilization apparatuses as well.

Alternatively, in the present invention, the personal information service apparatus may be configured to previously preserve and manage personal information. Such a configuration can eliminate the entry of additional information on an individual who is the owner of the personal information. In addition, the personal information service apparatus can be controlled to automatically transmit personal information to another personal information utilization apparatus if an agreement is established as a result of negotiations conducted with the personal information utilization apparatus in regard to the transmission of the personal information. It is therefore possible to safely, flexibly, and rapidly distribute personal information that has been previously preserved by the personal information service apparatus.

Further alternatively, in the present invention, the personal information service apparatus may be configured to receive the destination for personal information in accordance with manipulations of the personal information producer. By such a configuration, the personal information service apparatus can actively distribute personal information to a personal information utilization apparatus based on its own policy rather than passively waiting for a request from another personal information utilization apparatus. It is therefore possible to safely distribute personal information over a wide area based on a request from the personal information service apparatus.

Additionally, in the present invention, the personal information utilization apparatus may be configured to disclose personal information capsules and processing results preserved therein to the personal information service apparatus. According to such a configuration, an individual who is the owner of personal information can confirm whether or not the personal information is appropriately utilized in the personal information utilization apparatus. In addition, the personal information utilization apparatus can also prove that personal information is appropriately utilized in response to a request for confirmation from the individual, who is the owner of the personal information. It is therefore possible to give a sense of security to both of the individual who is the owner of the personal information and the personal information utilization apparatus which manages the personal information.

DETAILED DESCRIPTION OF THE PREFERRED EMBODIMENT

First Embodiment

Figure 1:
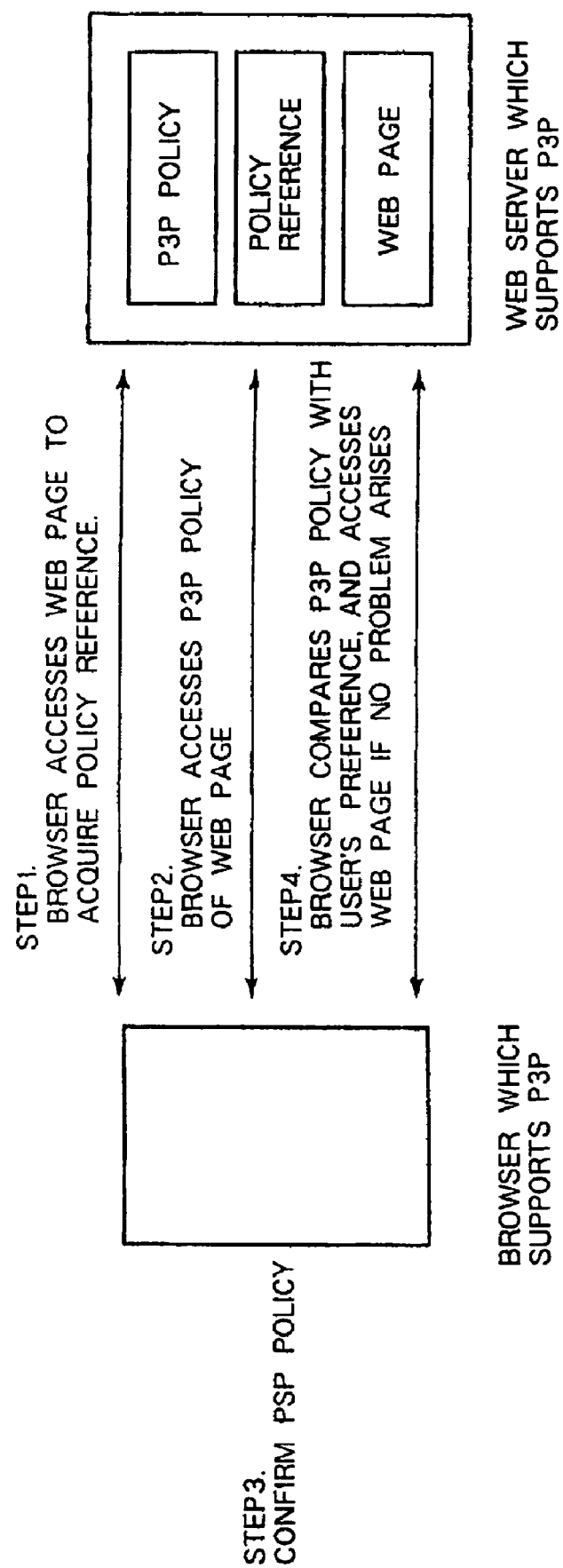
FIG. 1 is an explanatory diagram showing a P3P-based personal information exchange scheme.
Figure 2:
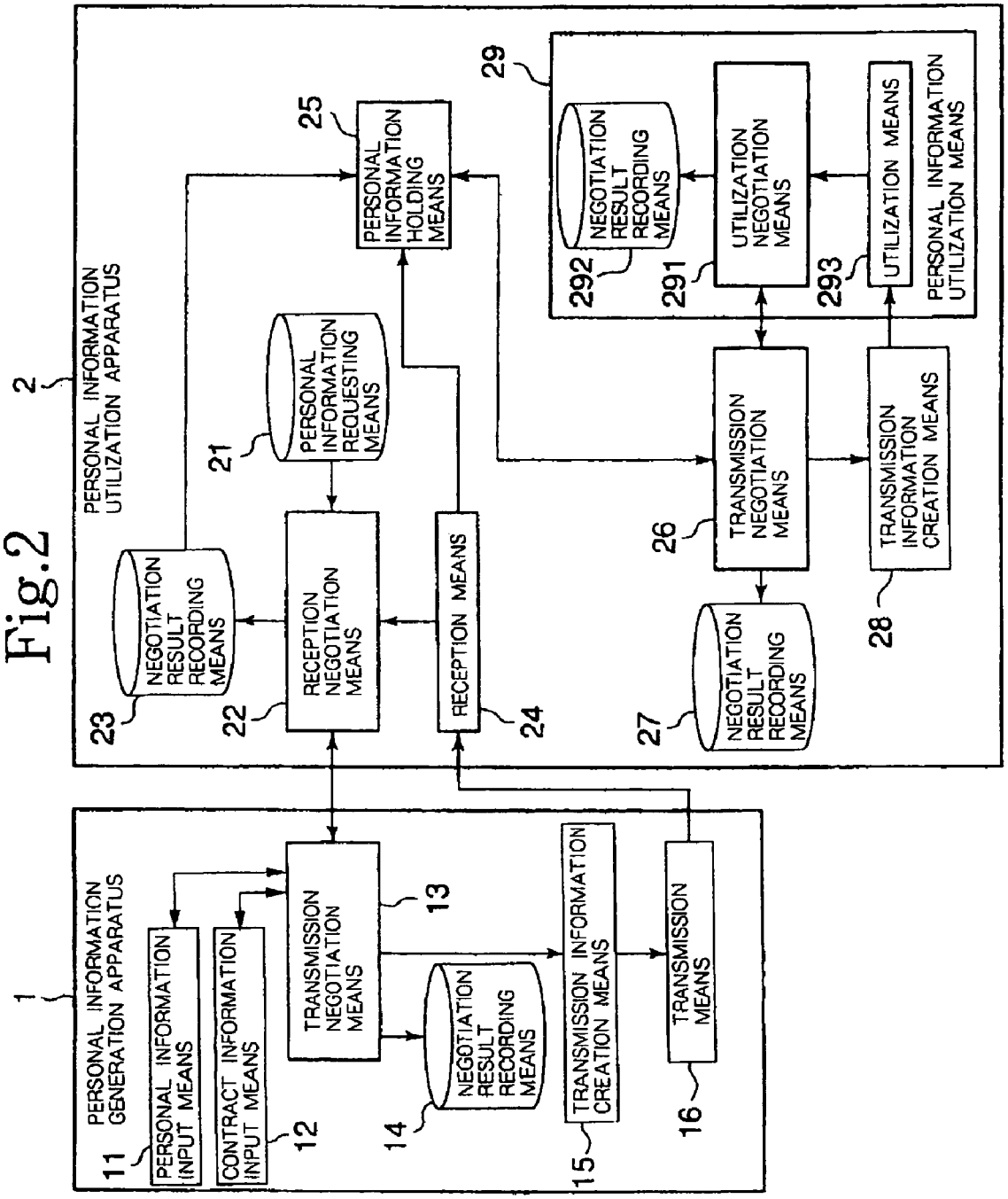
FIG. 2 is a block diagram illustrating an exemplary configuration of a personal information distribution management system according to the present invention.

In the following, a first embodiment of the present invention will be described with reference to FIGS. 2-4. FIG. 2 is a block diagram illustrating an exemplary configuration of a personal information distribution management system according to the present invention.

As illustrated in FIG. 2, the personal information distribution management system comprises personal information generation apparatus 1 for generating and transmitting a personal information capsule, and personal information utilization apparatus 2 for receiving the personal information capsule for utilization. Personal information generation apparatus 1 and personal information utilization apparatus 2 are interconnected through a communications network, for example, the Internet or the like.

In the first embodiment, the personal information distribution management system may be used, for example, in an application in which a web server provides a variety of services through the Internet based on users' personal information.

In the first embodiment, personal information utilization apparatus 2, for example, corresponds to a web server, and personal information generation apparatus 1 makes a transmission to a user terminal. In this event, personal information generation apparatus 1 accesses personal information utilization apparatus 2 through the Internet in accordance with instructions from the user in order to receive a variety of services through the Internet.

In response, personal information utilization apparatus 2 requests personal information generation apparatus 1 to transmit the user's personal information. When a predetermined contract has been established between personal information generation apparatus 1 and personal information utilization apparatus 2 in regard to utilization of personal information, personal information utilization apparatus 2 receives the personal information from personal information generation apparatus 1, and provides a variety of services through the Internet based on the received personal information.

A "personal information capsule" refers to information which include personal information encapsulated together with predetermined contract information. FIG. 3 is an explanatory diagram showing an exemplary personal information capsule. As shown in FIG. 3, the "personal information capsule" includes not only personal information but also information on a contract made between personal information generation apparatus 1 and personal information utilization apparatus 2 in regard to the utilization of personal information.

"personal information" refers to information indicative of attributes of an individual. In the first embodiment, the personal information capsule includes any information related to an individual as personal information. For example, the personal information capsule includes not only elements from which an individual can be identified, such as the name, address, telephone number and the like of the individual, but also elements such as hobby, taste and the like of the individual as personal information.

"contract information" refers to information indicative of the coverage of a contract concluded between personal information generation apparatus 1 and personal information utilization apparatus 2 in regard to how personal information is utilized under which conditions.

In the first embodiment, "contract information" is information which includes rules related to the distribution of information, defined on the basis of negotiations conducted between apparatuses which transmit and receive information, and which is shared by personal information generation apparatus 1 and personal information utilization apparatus 2.

In other words, in the first embodiment, the contract information is information for concluding a contract for utilization of personal information with personal information utilization apparatus 2 to which personal information is to be transmitted, and is information indicative of conditions for selecting personal information which can be provided to personal information utilization apparatus 2.

Figure 3:
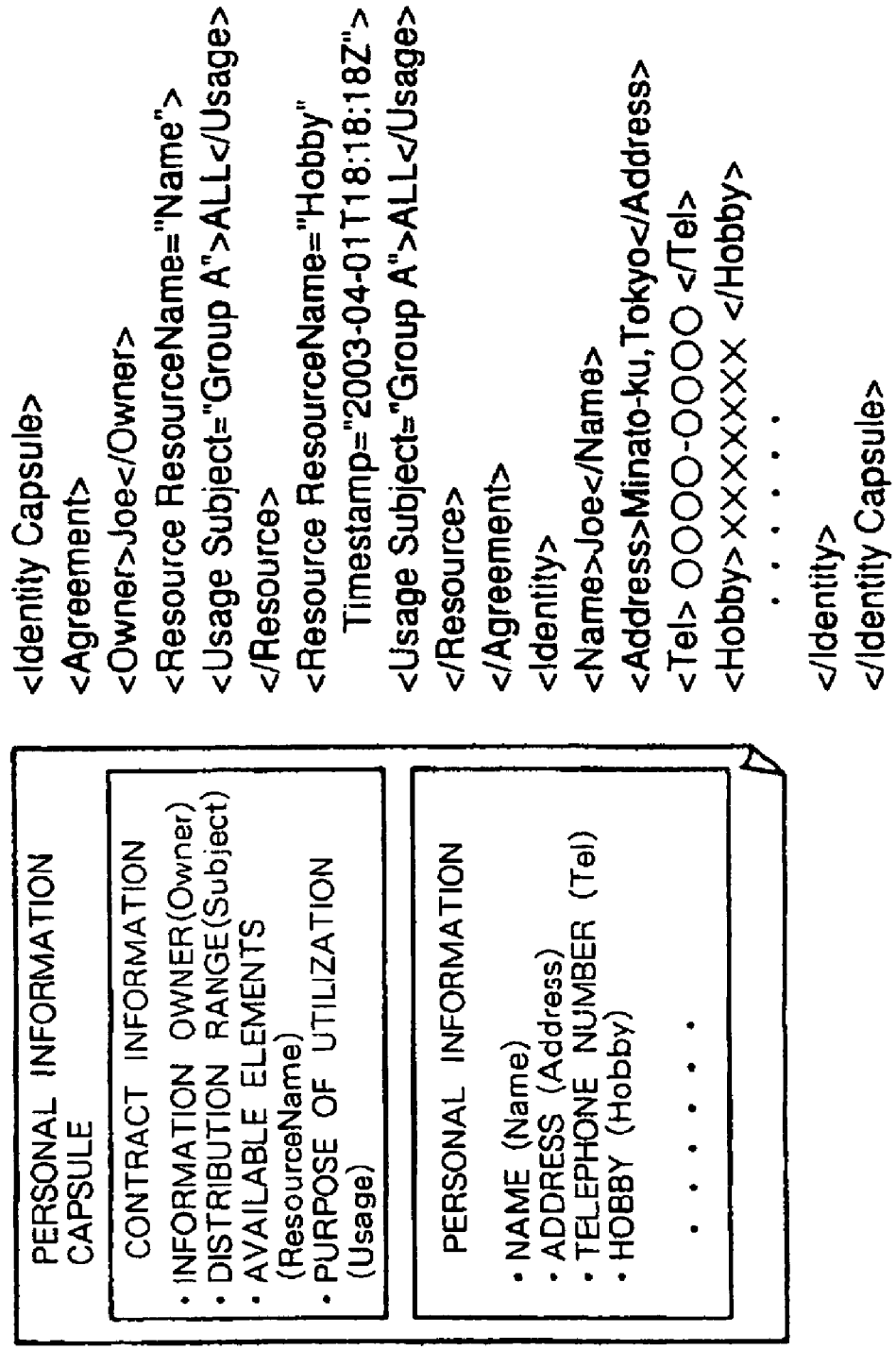
FIG. 3 is an explanatory diagram showing an exemplary personal information capsule.
Figure 4:
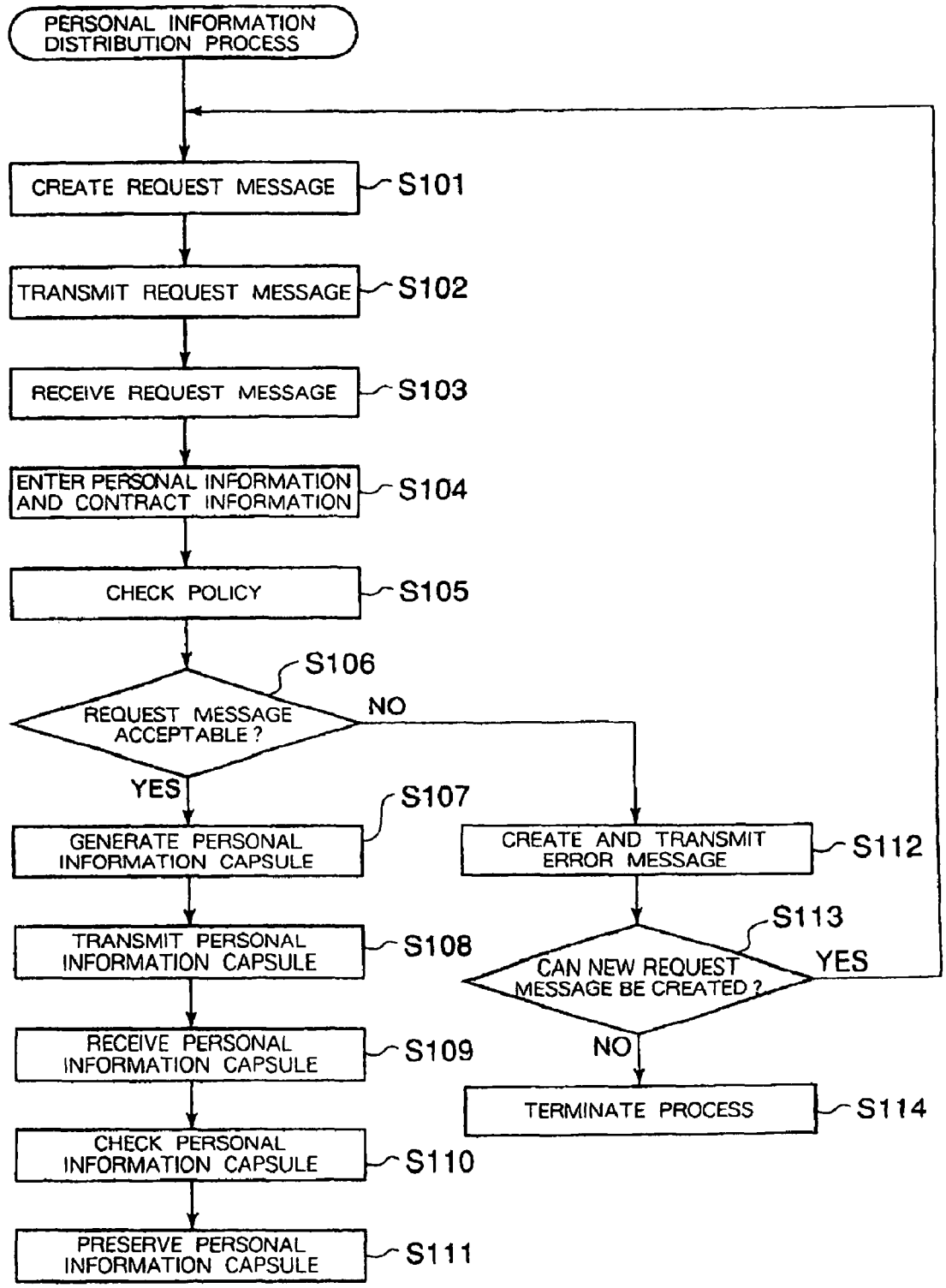
FIG. 4 is a flow diagram illustrating an exemplary process for distributing and managing personal information between a personal information generation apparatus and a personal information utilization apparatus.

As shown in FIG. 3, the contract information includes information (also called "owner information") indicative of a user whose information will be revealed by personal information to be distributed, distribution range information indicative of a range of apparatuses to which personal information may be distributed (also called "utilization apparatuses"), available element information indicative of elements of personal information which may be utilized by utilization apparatuses, and utilization purpose information indicative of the purpose for utilizing personal information.

For example, contract information includes identification information such as a user ID, an apparatus ID or the like as owner information and distribution range information. Also, contract information includes, for example, purpose information such as "creation of a mailing list," "aggregation of survey" or the like as utilization purpose information.

This contract information is not unilaterally defined by a transmitter, but is determined to have appropriate coverage through negotiations conducted between the transmitter and receiver based on a personal information transmission policy defined by a personal information producer and a personal information reception policy held by a personal information requester.

The "personal information transmission policy" refers to a policy indicative of a range of personal information which can be provided (transmitted) by an apparatus that transmits the personal information (personal information generation apparatus 1 in the embodiment) to other apparatuses, and conditions under which the personal information can be provided (transmitted).

In the first embodiment, the "personal information transmission policy" provides information referenced by an apparatus which transmits information in order to conclude a contract with a utilization apparatus and create contract information.

In other words, the personal information transmission policy is a policy indicative of rules related to the distribution of personal information, and is a policy (setting information) indicative of transmission conditions under which personal information is transmitted to personal information utilization apparatus 2.

The "personal information transmission policy" also includes information which defines elements of personal information which can be transmitted (i.e., which may be utilized by other apparatuses), a range of personal information utilization apparatus 2 which may transmit the personal information, and purposes for which personal information utilization apparatus 2 may utilize the personal information.

In the first embodiment, the personal information transmission policy is in the same data format as that of the contract information in the personal information capsule.

The "personal information reception policy" refers to a policy indicative of reception conditions under which an apparatus which receives personal information (personal information utilization apparatus 2 in the first embodiment) receives the personal information. In the first embodiment, the "personal information reception policy" provides information for an apparatus which receives the personal information to conclude a contract with personal information generation apparatus 1 and create contract information, and is a policy for determining the contents of personal information which are to be requested.

Also, the "personal information reception policy" includes information which defines required elements of personal information, a purpose for which the personal information is utilized, and a range of apparatuses which may utilize the personal information. In the first embodiment, the personal information reception policy is in the same data format as that of the contract information in the personal information capsule.

The "policy" refers to rules related to the distribution of information held by each apparatus, and differs from one apparatus to another.

In the first embodiment, since a receiver can receive only information that he requires after a contract has been concluded between a transmitter and the receiver, it is possible to reduce the risk of information leakage.

On the other hand, since the transmitter concludes a transmission contract based on provisions of a personal information producer, the transmitter can clarify the responsibility for the transmission of information between the personal information producer and transmitter.

Personal information generation apparatus 1 is an apparatus for use by a personal information producer (user) who creates personal information, and is specifically implemented by an information processing apparatus such as a personal computer.

As illustrated in FIG. 2, personal information generation apparatus 1 comprises personal information input means 11, contract information input means 12, transmission negotiation means 13, negotiation result recording means 14, transmission information creation means 15, and transmission means 16.

It should be understood that while FIG. 2 shows one personal information generation apparatus 1, the personal information distribution management system may comprise a plurality of personal information generation apparatuses 1.

Each of personal information input means 11 and contract information input means 12 is specifically implemented by a CPU of an information processing apparatus which operates in accordance with a program, and an input device such as a mouse, a keyboard and the like.

Personal information input means 11 comprises a function of receiving personal information in accordance with manipulations of a personal information producer.

Contract information input means 12 comprises a function of receiving a variety of contract conditions in accordance with manipulations of the personal information producer.

Contract information input means 12 receives information (personal information transmission policy) required to conclude a contract with another apparatus (personal information utilization apparatus 2 in the first embodiment) other than personal information generation apparatus 1.

In the first embodiment, contract information input means 12 receives owner information indicative of the user of personal information generation apparatus 1, indicative of the purpose of utilization corresponding to personal information supplied through personal information input means 12, and indicative of information for limiting available information elements and utilization apparatuses.

Transmission negotiation means 13 is specifically implemented by the CPU of an information processing apparatus which operates in accordance with a program, and by a network interface unit. Transmission negotiation means 13 comprises functions of transmitting and receiving a variety of information to and from personal information utilization apparatus 2 through the communications network, and concluding a contract related to the utilization of personal information in accordance with a request from another personal information utilization apparatus 2.

Specifically, in the first embodiment, transmission negotiation means 13 checks the personal information transmission policy against the personal information reception policy to determine conditions for selecting personal information which can be provided to personal information utilization apparatus 2.

In the first embodiment, when a contract is concluded, transmission negotiation means 13 transmits a request for transmission of personal information from personal information utilization apparatus 2.

The transmission negotiation means 13 also receives the personal information reception policy from personal information utilization apparatus 2, together with the request for transmission of personal information.

Transmission negotiation means 13 further checks information (personal information transmission policy) supplied through contract information input means 12 against information (personal information reception policy) received from personal information utilization apparatus 2.

Then, as an agreement is reached between personal information generation apparatus 1 and personal information utilization apparatus 2, transmission negotiation means 13 generates predetermined contract information, and executes a process for determining the coverage of a personal information utilization contract in order to conclude the contract.

Transmission negotiation means 13 extracts information included in the personal information reception policy, which matches information included in the personal information transmission policy, for example, based on the result of the check.

Then, transmission negotiation means 13 generates contract information including the extracted information. In the first embodiment, transmission negotiation means 13 generates the contract information which includes owner information indicative of the user of personal information generation apparatus 1, a list of utilization apparatuses to which the personal information may be distributed (distribution range information), elements of personal information to be transmitted (available element information), and information on the purpose of utilizing the personal information.

Transmission negotiation means 13 determines that no agreement will be established between personal information generation apparatus 1 and personal information utilization apparatus 2 if the personal information transmission policy differs from personal information reception policy in one or more of the following items: owner, range of distribution, available information elements, and purpose of utilization.

In this event, transmission negotiation means 13 generates notification information indicative of a failure to establish of an agreement, which is transmitted to personal information utilization apparatus 2 through the communications network.

Negotiation result recording means 14 is specifically implemented by a storage device such as a magnetic disk drive. Negotiation result recording means 14 records contract information generated by transmission negotiation means 13 in accordance with the result of negotiations between transmission negotiation means 13 and the other personal information utilization apparatus 2.

Transmission information creating means 15 is specifically implemented by the CPU of an information processing apparatus which operates in accordance with a program.

Transmission information creating means 15 has a function of creating a personal information capsule for transmission to personal information utilization apparatus 2 based on contract information created by transmission negotiation means 13.

In the first embodiment, transmission information creating means 15 encapsulates personal information received through personal information input means 11 together with contract information generated by transmission negotiation means 13 to generate a personal information capsule.

In the first embodiment, transmission information creating means 15 generates a personal information capsule that includes the contract information generated by transmission negotiation means 13 in accordance with the result of negotiations with personal information utilization apparatus 2, as the contract information, instead of the information (personal information transmission policy) received through contract information input means 12 in accordance with manipulations of the user.

In this event, transmission information creating means 15 limits personal information to be transmitted, based on the contract information, to generate a personal information capsule that includes the limited personal information.

For example, transmission information creating means 15 extracts information elements indicated in available element information included in the contract information from among the personal information received through personal information input means 11. Then, transmission information creating means 15 generates a personal information capsule which includes only the extracted information elements of the personal information.

Transmission means 16 is specifically implemented by the CPU of an information processing apparatus which operates in accordance with a program, and by a network interface unit. Transmission means 16 comprises a function of transmitting the personal information capsule created by transmission information creation means 15 to the other personal information utilization apparatus 2 through the communications network.

Personal information utilization apparatus 2 is a server or the like which utilizes personal information, and is specifically implemented by an information processing apparatus such as a workstation, a personal computer or the like. As illustrated in FIG. 2, personal information utilization apparatus 2 comprises personal information requesting means 21, reception negotiation means 22, negotiation result recording means 23, reception means 24, personal information holding means 25, transmission negotiation means 26, negotiation result recording means 27, transmission information creation means 28, and personal information utilization unit 29.

Personal information requesting means 21 is specifically implemented by a storage device such as a magnetic disk drive or the like. Personal information requesting means 21 manages information required to conclude a contract for transmission and reception of personal information (for example, information indicative of personal information required by personal information utilization apparatus 2, and information indicative of a purpose for utilizing the personal information).

Specifically, personal information requesting means 21 previously stores a policy for determining the contents of personal information to be requested. In the first embodiment, personal information requesting means 21 previously stores a personal information reception policy. For example, the personal information reception policy is previously created by a manager of a program for executing a variety of processes utilizing personal information (a program for implementing personal information utilization unit 29), and is previously stored in personal information requesting means 21.

When personal information utilization apparatus 2 includes a plurality of personal information utilization units 29 (when there are a plurality of programs which utilize personal information), personal information requesting means 21 previously stores a plurality of personal information reception policies.

Reception negotiation means 22 is specifically implemented by the CPU of an information processing apparatus which operates in accordance with a program, and by a network interface unit. Reception negotiation means 22 comprises functions of transmitting and receiving a variety of information to and from personal information generation apparatus 1 through the communications network, and of concluding a contract in regard to the utilization of personal information.

In the first embodiment, when a contract is concluded, reception negotiation means 22 transmits a request for transmission of personal information (also called a "request message") to personal information generation apparatus 1 through the communications network.

In the first embodiment, reception negotiation means 22 transmits the request message for concluding a contract with personal information generation apparatus 1 in regard to distribution based on the personal information reception policy stored in personal information requesting means 21 to personal information generation apparatus 1 through the communications network.

In this event, reception negotiation means 22 extracts the personal information reception policy from personal information requesting means 21. Reception negotiation means 22 also transmits an instructions for requesting personal information required by personal information utilization apparatus 2, based on the extracted personal information reception policy, to personal information generation apparatus 1 through the communications network. Then, reception negotiation means 22 reaches an agreement in regard to the utilization of the personal information with personal information generation apparatus 1.

Upon receipt of notification of information indicative of a failure to in establish an agreement from personal information generation apparatus 1, reception negotiation means 22 determines whether or not personal information requesting means 21 has stored another personal information reception policy.

When another personal information reception policy is stored in personal information requesting means 21, reception negotiation means 22 extracts the other personal information reception policy from personal information requesting means 21, and again transmits a request message to personal information generation apparatus 1 based on the extracted personal information reception policy.

Negotiation result recording means 23 is specifically implemented by a storage device such as a magnetic disk drive. Negotiation result recording means 23 records information on contracts concluded by reception negotiation means 22 with personal information generation apparatus 1, and also records negotiation histories.

Reception means 24 is specifically implemented by the CPU of an information processing apparatus which operates in accordance with a program, and by a network interface unit. Reception means 24 comprises a function of receiving a personal information capsule from personal information generation apparatus 1 through the communications network.

Personal information holding means 25 is specifically implemented by the CPU of an information processing apparatus which operates in accordance with a program, and by storage device such as a magnetic disk drive. Personal information holding means 25 comprises a function of holding (preserving) personal information capsules received by reception means 24 from personal information generation apparatus 1.

Personal information holding means 25 also comprises a function of confirming (determining) based on contract information stored in negotiation result recording means 23 whether or not a personal information capsule complies with the contract information exchanged with personal information generation apparatus 1 before the personal information capsule is held therein.

In this event, for example, personal information holding means 25 checks the contract information stored in negotiation result recording means 23 against contract information included in the personal information capsule to determine whether or not information included in the former contract information matches information included in the latter contract information.

When the information included in the former contract information matches the information included in the latter contract information, personal information holding means 25 determines that the personal information capsule complies with the contract information exchanged with personal information generation apparatus 1.

On the other hand, when the information included in the former contract information does not match the information included in the latter contract information, personal information holding means 25 determines that the personal information capsule does not comply with the contract information exchanged with personal information generation apparatus 1.

Transmission negotiation means 26 is specifically implemented by the CPU of an information processing apparatus which operates in accordance with a program. Transmission negotiation means 25 comprises a function of confirming the purpose of utilizing personal information included in a personal information capsule held by personal information holding means 25 when personal information utilization unit 29 is going to utilize the personal information.

Specifically, in the first embodiment, transmission negotiation means 26 checks utilization conditions, under which personal information utilization apparatus 2 utilizes the personal information, against contract information (selection conditions) included in the personal information capsule preserved by personal information holding means 25 to determine conditions for selecting available information.

Transmission negotiation means 26 also comprises a function of determining in accordance with the purpose for utilizing the personal information whether or not personal information utilization unit 29 is permitted to utilize the personal information.

According to the process executed by transmission negotiation means 26 to confirm the purpose of utilization, it is possible to observe the contract concluded between personal information utilization apparatus 2 and personal information generation apparatus 1 in regard to the utilization of personal information.

In the first embodiment, when personal information is utilized, transmission negotiation means 26 is supplied with a utilization policy, from personal information utilization unit 29, indicative of a range of personal information elements required by personal information utilization unit 29, and the purpose for utilizing the personal information elements.

Transmission negotiation means 26 also checks contract information included in the personal information capsule stored in personal information holding means 25 against the supplied utilization policy.

Specifically, transmission negotiation means 26 checks the contract information included in the personal information capsule against the utilization policy in order to confirm limitations related to the utilization of the personal information.

Transmission negotiation means 26 also extracts information included in the utilization policy, which matches information included in the contract information, based on the result of the check. Transmission negotiation means 26 generates contract information (called "user-side contract information") including the extracted information.

Negotiation result recording means 27 is specifically implemented by a storage device such as a magnetic disk drive. Negotiation result recording means 27 records the result of negotiations conducted by transmission negotiation means 26 with personal information utilization unit 29 (check result).

In the first embodiment, negotiation result recording means 27 registers the personal information utilization history which includes available elements of personal information included in the personal information capsule, and also includes the purpose of utilizing the personal information.

Transmission information creation means 28 is specifically implemented by the CPU of an information processing apparatus which operates in accordance with a program. Transmission information creation means 28 comprises a function of limiting information not utilized within elements of personal information included in a personal information capsule based on the result of the determination made by transmission negotiation means 26.

Transmission information creation means 28 also comprises a function of supplying personal information utilization unit 29 with elements of personal information utilized by personal information utilization unit 29 based on the result of the limitation.

In the first embodiment, transmission information creation means 28 extracts available information elements, from among the personal information included in the personal information capsule, indicated by the user-side contract information generated by transmission negotiation means 26.

Specifically, transmission information creation means 28 selects information elements included in the personal information in accordance with the user-side contract information (determined selection conditions) generated by transmission negotiation means 26. Then, transmission information creation means 28 supplies the extracted information elements of the personal information to personal information utilization unit 29.

Personal information utilization unit 29 comprises utilization negotiation means 291, negotiation means recording means 292, and utilization means 293. Utilization negotiation means 291 is specifically implemented by the CPU of an information processing apparatus which operates in accordance with a program for providing a variety of services to the user by utilizing the personal information.

Utilization negotiation means 291 comprises functions of communicating elements of personal information required by personal information utilization unit 29 and the purpose for utilizing the information elements to transmission negotiation means 26, and concluding an agreement in regard to the utilization. Specifically, utilization negotiation means 291 supplies information related to the utilization of the personal information (elements of personal information and information on the purpose of utilizing the information elements) to transmission negotiation means 26 to form an agreement with transmission negotiation means 26 in regard to the utilization of the personal information.

In the first embodiment, utilization negotiation means 291 receives a personal information utilization policy from utilization means 293 upon utilization of personal information. Then, utilization negotiation means 291 supplies the received utilization policy to transmission negotiation means 26.

Negotiation result recording means 292 is specifically implemented by a storage means such as a magnetic disk drive. Negotiation result recording means 292 records the user-side contract information exchanged by utilization negotiation means 291 with transmission negotiation means 26 for utilizing the personal information, and also records negotiation histories.

Utilization means 293 is specifically implemented by the CPU of an information processing apparatus which operates in accordance with a program for providing a variety of services to the user by utilizing the personal information, and by an input device such as a mouse, a keyboard or the like. Utilization means 293 comprises a function of communicating a request for the utilization of personal information (including a utilization policy) to utilization negotiation means 291.

Utilization means 293 also comprises a function of receiving personal information from transmission information creation means 28 based on the result of negotiations conducted by utilization negotiation means 291. Utilization means 293 further comprises a function of utilizing the received personal information.

In the first embodiment, utilization means 293 receives designation of the elements in personal information that are to be utilized, and the purpose for utilizing the elements, for example, in accordance with input manipulations made by the user of the program for providing a variety of services to the user by utilizing the personal information.

Utilization means 293 also communicates a request for utilization of personal information by supplying the received utilization policy (designation information and purpose of utilization) to utilization negotiation means 291. Then, utilization means 293 receives the personal information from transmission information creation means 28 and executes a variety of processes by utilizing the personal information.

Next, the operation will be described. FIG. 4 is a flow diagram illustrating an exemplary process for distributing and managing personal information between the personal information generation apparatus and personal information utilization apparatus.

First, a description will be given of the operation for providing personal information from personal information generation apparatus 1 to personal information utilization apparatus 2. For example, when the user of personal information generation apparatus 1 receives the provision of a variety of services from personal information utilization apparatus 2, personal information generation apparatus 1 accesses personal information utilization apparatus 2 through the communications network in accordance with instructions of the user. In response, personal information utilization apparatus 2 requests personal information generation apparatus 1 for personal information through the communications network.

In the process for requesting personal information, reception negotiation means 22 first extracts, from personal information requesting means 21, a personal information reception policy which includes elements of the personal information required by personal information utilization apparatus 2, the purpose for utilizing the personal information, and the information required for a contract such as a list of apparatuses which will utilize the personal information. Reception negotiation means 22 in turn generates a request message based on the extracted personal information reception policy (step S101).

Alternatively, this personal information reception policy, which is information required for a contract, may be determined by personal information utilization unit 29.

Next, contract information is generated between personal information utilization apparatus 2 and personal information generation apparatus 1, and a contractual coverage is determined in regard to the utilization of the personal information. In this process for determining the contractual coverage, reception negotiation means 22 first transmits the generated request message to personal information generation apparatus 1 through the communications network (step S102).

For example, reception negotiation means 22 transmits the personal information reception policy, as included in a request message, to transmission negotiation means 13.

Transmission negotiation means 13 also receives the request message from personal information utilization apparatus 2 through the communications network (step S103). In response, transmission negotiation means 13 displays a personal information entry request, for example, on a display device based on the received request message to prompt a personal information producer to enter personal information.

Personal information input means 11 receives personal information in accordance with instructions entered by the personal information producer. Simultaneously with the entry of the personal information, contract information input means 12 receives information (personal information transmission policy) which is base information for determine contract information between personal information generation apparatus 1 and personal information utilization apparatus 2 at the time when the personal information is transmitted (step S104).

By entering the aforementioned information (personal information transmission policy), the personal information, producer can define rules for transmitting and utilizing the personal information.

Next, transmission negotiation means 13 checks the information (personal information transmission policy), received through contract information input means 12, which is base information for determine the contract information against the contents of the request message (personal information reception policy [step S105]).

In this event, transmission negotiation means 13 executes a process for receiving the request message only when the contents described in the personal information transmission policy defined by the personal information producer match items described in the request message.

Transmission negotiation means 13 also determines based on the result of the check whether or not the request message should be accepted (whether or not the personal information should be transmitted in response to a transmission request from personal information utilization apparatus 2[step S106]).

Upon determining that the request message should be accepted, transmission negotiation means 13 generates, for example, contract information including the contents of the personal information reception policy in the request message. Also, Upon determining that the request message should be accepted, transmission negotiation means 13 extracts information included in the personal information reception policy, which matches the information included in the personal information transmission policy, and generates contract information including the extracted information.

When the contract information is generated, transmission negotiation means 13 registers the generated contract information in negotiation result storage means 14. Transmission negotiation means 13 also transmits the generated contract information to personal information utilization apparatus 2 through the communications network.

In this event, upon receipt of the contract information from personal information generation apparatus 1, reception negotiation means 22 stores the received contract information in negotiation result recording means 23. Additionally, reception negotiation means 22 may also store the request message transmitted at step 102 in negotiation result recording means 23.

Transmission information creation means 15 is supplied with the contract information from transmission negotiation means 13 and with the personal information entered through personal information input means 11. Transmission information creation means 15 also extracts information elements indicated in available element information included in the contract information, from among the personal information entered through personal information input means 11, to create a personal information capsule (step S107).

Then, transmission means 16 transmits the personal information capsule created by transmission information creation means 15 to personal information utilization apparatus 2 through the communications network (step S108).

Reception means 24 of personal information utilization apparatus 2 receives the personal information capsule from personal information generation apparatus 1 through the communications network (step S109). In this event, personal information holding means 25 checks the contract information included in the personal information capsule against the contract information and the contents of the request message stored in negotiation result recording means 23 (step S110).

Then, personal information holding means 25 confirms based on the result of the check that the personal information included in the received personal information capsule is information based on the request message. When personal information holding means 25 determines correct personal information as a result of the check, the contract information included in the personal information capsule is stored in negotiation result recording means 23. The personal information holding means 25 also registers the received personal information capsule (step S111).

On the other hand, when transmission negotiation means 13 determines at step S106 that the request message should not be accepted as a result of checking the information (personal information transmission policy) which bases the contract information received through contract information input means 12 on the contents of the request message (personal information reception policy), transmission negotiation means 13 creates a message (notification information) that indicates of that the transmission has not been accepted.

Then, transmission negotiation means 13 transmits the created message to personal information utilization apparatus 2 through the communications network (step S112).

Reception negotiation means 22 of personal information utilization apparatus 2 receives the message from personal information generation apparatus 1 through the communications network. Then, reception negotiation means 22 determines whether or not a new request message can be created (step S113).

In this event, for example, reception negotiation means 22 determines whether or not any of personal information reception policies stored in personal information requesting means 21 have not been transmitted as a request message. Upon determining that there is any policy which has not been transmitted, reception negotiation means 22 determines that a new request message can be created.

On the other hand, upon determining that request messages have been created and transmitted for all personal information reception policies stored in personal information requesting means 21, reception negotiation means 22 determines that a new request message can no longer be created.

Upon determining that a request message can be created, reception negotiation means 22 returns again to processing at step S101 to repeatedly execute processing at step S101 onward. Specifically, a request message is repeatedly created on the basis of the next personal information reception policy stored in personal information requesting means 21, and is transmitted to personal information generation apparatus 1.

When reception negotiation means 22 determines that a request message can no longer be created, personal information utilization apparatus 2 terminates the process without further action. Specifically, in this event, since no agreement is established for the utilization of personal information between personal information generation apparatus 1 and personal information utilization apparatus 2, personal information generation apparatus 1 does not transmit personal information to personal information utilization apparatus 2, and terminates the process without further action.

Next, a description will be given of the operation when personal information utilization apparatus 2 utilizes personal information. First, personal information utilization unit 29 determines, together with transmission negotiation means 26, user-side contract information related to the utilization of personal information. In this event, utilization means 293 communicates required elements for the personal information and the purpose of utilizing the personal information (utilization policy) to utilization negotiation means 291.

Next, negotiations are conducted between utilization negotiation means 291 and transmission negotiation means 26 for determining elements of the personal information to be utilized and for determining the purpose of utilizing the personal information. Then, transmission negotiation means 26 registers the result of the negotiations in negotiation result recording means 27. Utilization negotiation means 291 in turn registers the result of the negotiations in negotiation result recording means 292.

In this event, transmission negotiation means 26 and utilization negotiation means 291 execute a negotiation process through a request message sent from utilization negotiation means 291 to transmission negotiation means 26 in accordance with a process similar to that performed between personal information requesting means 21 and reception negotiation means 22.

Transmission negotiation means 26 and utilization negotiation means 291 also execute the negotiation process in accordance with a process similar to that performed between reception negotiation means 22 and transmission negotiation means 13.

For reference, the negotiation process performed between transmission negotiation means 26 and utilization negotiation means 291 differs from the negotiation process performed between transmission negotiation means 13 and reception negotiation means 22 in that personal information and contract information are entered from personal information holding means 25 instead of being entered from the information using personal information and contract information input means.

Specifically, transmission negotiation means 26 generates the user-side contract information by checking contract information included in a personal information capsule stored in personal information holding means 25 against a utilization policy supplied from utilization negotiation means 291.

Transmission information creation means 28 in turn extracts personal information which is to be passed to personal information utilization unit 29 based on the result of processing performed by transmission negotiation means 26. Specifically, transmission information creation means 28 extracts personal information available to personal information utilization unit 29 from personal information included in personal information capsules stored in personal information holding means 25 in accordance with the user-side contract information generated by transmission negotiation means 26.

Next, transmission information creation means 28 passes the extracted personal information to utilization means 293. Then, utilization means 293 utilizes the personal information received from transmission information creation means 28. For example, utilization means 293 executes a variety of processes based on the personal information to provide a variety of services to the user.

As described above, according to the first embodiment, personal information generation apparatus 1 and personal information utilization apparatus 2 distribute personal information based on contract information in regard to the utilization of personal information. A contract is previously established between the apparatuses in regard to the utilization of personal information before the contract information is generated, and the information is distributed on the basis of the contract information, so that it is possible to clarify where the responsibility lies and safely distribute and manage the personal information.

Accordingly, on the premise that an agreement has been reached in regard to determination of transmission and reception activities and selection of personal information to be distributed, the personal information can be distributed for utilization based on the coverage of the agreement.

Also, according to the first embodiment, since personal information generation apparatus 1 is required to refrain from transmitting personal information which is determined as inappropriate based on contract information, the possibility that individual privacy can be compromised by personal information generation apparatus 1 can be reduced.

Also, according to the first embodiment, since personal information utilization apparatus 2 is required to refrain from receiving personal information determined as inappropriate based on contract information, the possibility that individual privacy can be compromised by personal information generation apparatus 2 can be reduced.

Second Embodiment

Figure 5:
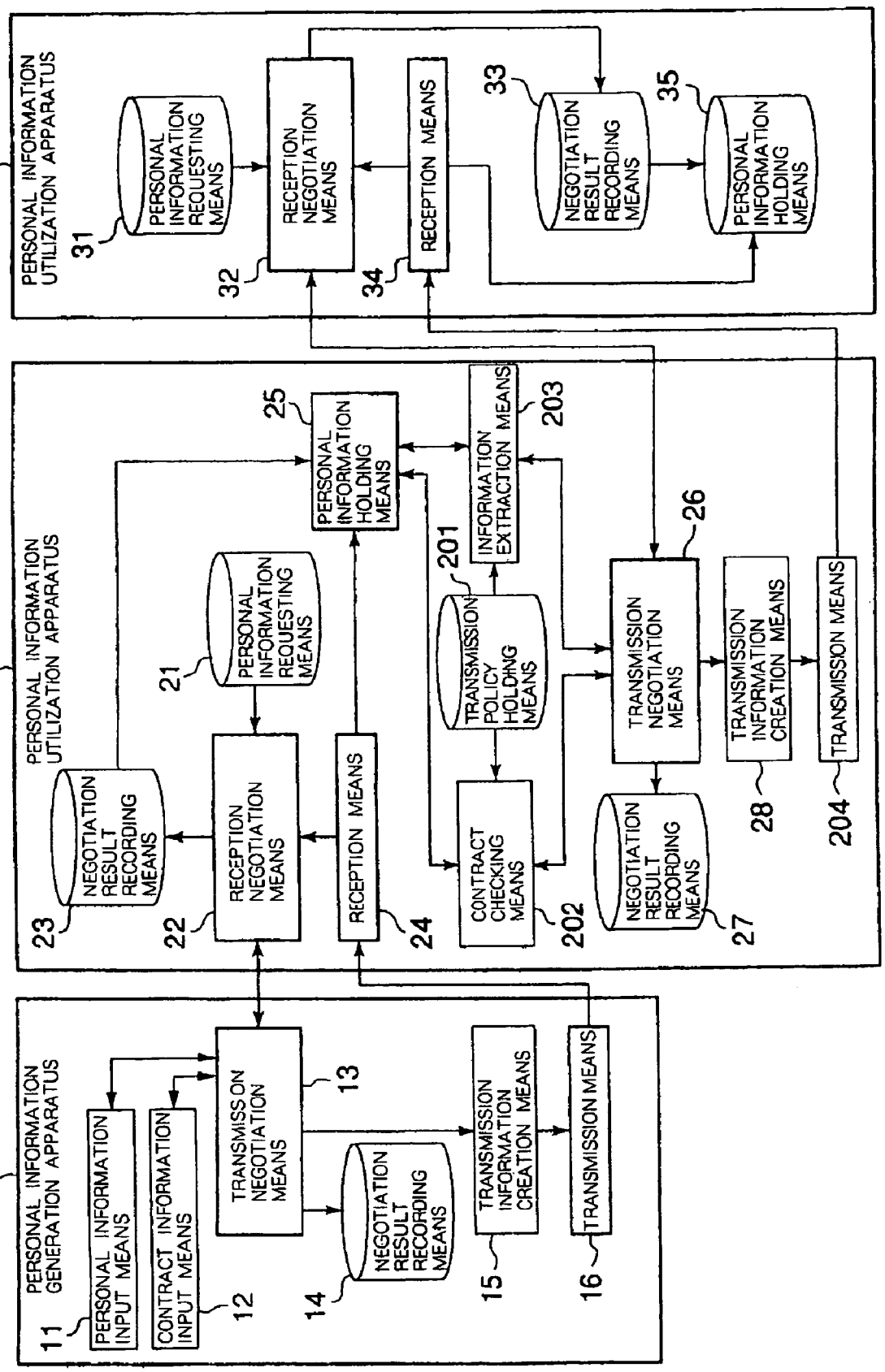
FIG. 5 is a block diagram illustrating another exemplary configuration of the personal information distribution management system.
Figure 6:
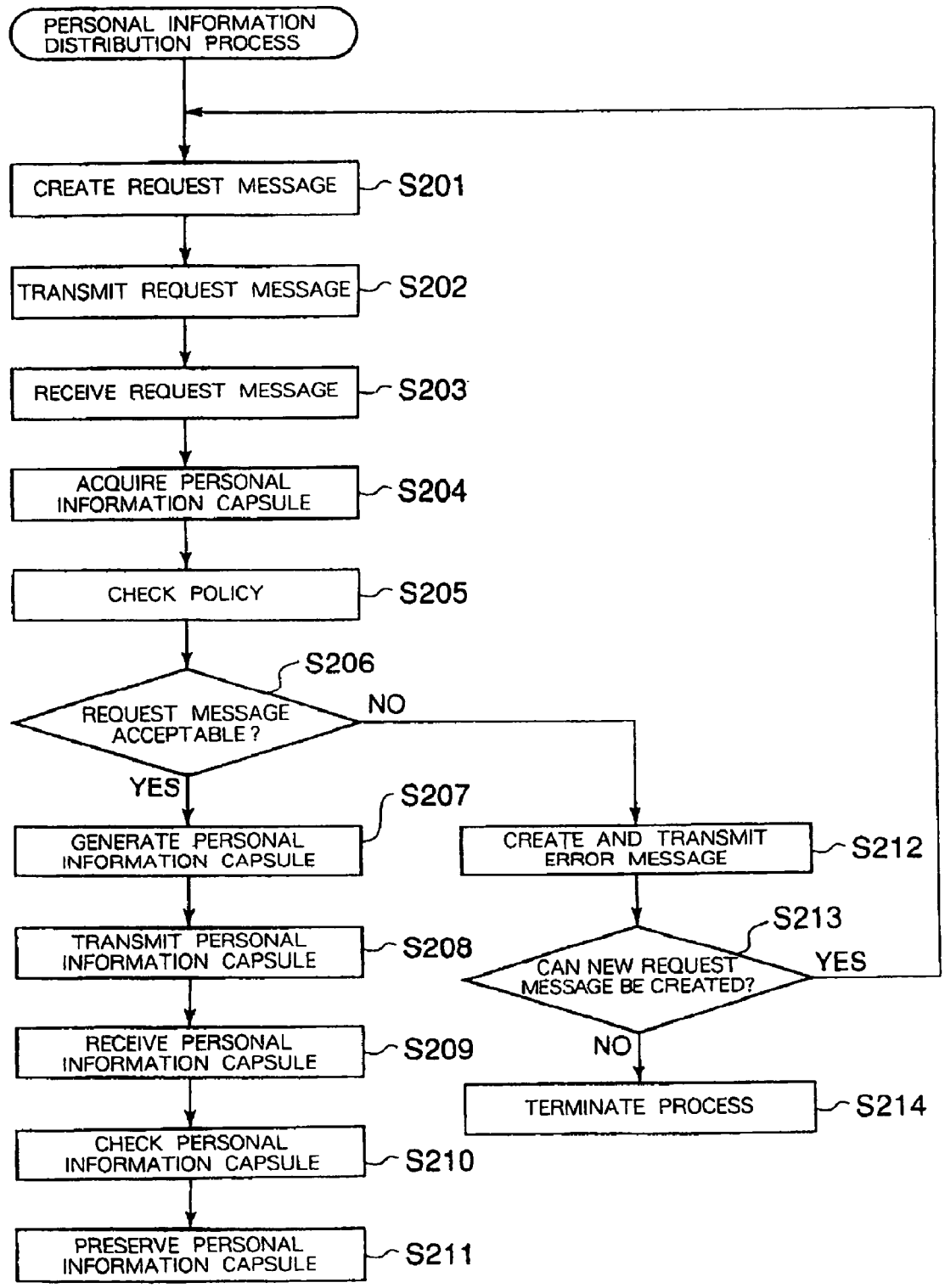
FIG. 6 is a flow diagram illustrating an exemplary process for distributing personal information from personal information utilization apparatus 4 to another personal information utilization apparatus 3.

Next, a second embodiment of the present invention will be described with reference to FIGS. 5 and 6. FIG. 5 is a block diagram illustrating another exemplary configuration of the personal information distribution management system.

As illustrated in FIG. 5, in the second embodiment, the personal information distribution management system comprises personal information generation apparatus 1 and two personal information utilization apparatuses 3, 4. Personal information generation apparatus 1 and each personal information utilization apparatus 3, 4 are interconnected through a communications network such as LAN, the Internet or the like.

The second embodiment will be described in connection with a scenario where, after personal information has been provided from personal information generation apparatus 1 to personal information utilization apparatus 4, the personal information is again distributed from personal information utilization apparatus 4 to another personal information utilization apparatus 3. While FIG. 5 shows two personal information utilization apparatuses 3, 4, the personal information distribution management system may include two or more personal information utilization apparatuses.

As illustrated in FIG. 5, the second embodiment differs from the first embodiment in that personal information utilization apparatus 4 comprises transmission policy holding means 201, contract combination means 202, and information extraction means 203 in addition to the components of personal information utilization apparatus 2 in the first embodiment illustrated in FIG. 2.

The second embodiment also differs from the first embodiment in that personal information utilization unit 29 in the first embodiment illustrated in FIG. 2 is not included in personal information utilization apparatus 2 but is configured as an independent apparatus (personal information utilization apparatus 3). In other words, in the second embodiment, personal information utilization apparatus 3 corresponds to personal information utilization unit 29 shown in the first embodiment.

Transmission policy holding means 201 is specifically implemented by a storage device such as a magnetic disk drive. Transmission policy holding means 201 stores a transmission policy under which personal information utilization apparatus 4 transmits personal information to personal information utilization apparatus 3. In other words, in the second embodiment, transmission policy holding means 201 previously preserves a transmission policy for managing the forwarding of a personal information policy.

The "transmission policy" refers to a policy which shows transmission conditions under which personal information utilization apparatus 4 transmits personal information to personal information utilization apparatus 3. In the second embodiment, the "transmission policy" includes a data transmission policy which shows conditions related to data transmission, and a contract policy which shows conditions related to a personal information utilization contract.

The data transmission policy includes information (available elements) which defines personal information which is not to extract elements which can be presented (prohibited from being transmitted) to a destination from among personal information elements. In a process through which personal information utilization apparatus 4 concludes a contract with personal information utilization apparatus 3, personal information utilization apparatus 4 does not notify destination personal information utilization apparatus 3 of the existence of personal information which is not to extract elements which can be presented to the destination from among personal information elements, shown in the data transmission policy (i.e., does not transmit the personal information).

The contract policy in turn includes information on the limitations to purposes for utilizing personal information at the destination apparatus, and limitations (distribution range) to destinations to which the destination apparatus re-distributes the personal information. In the second embodiment, personal information utilization apparatus 4 references the contract policy included in the transmission policy when it concludes a contract with a destination of personal information.

Specifically, personal information utilization apparatus 4 concludes a personal information utilization contract with personal information utilization apparatus 3 based on contract information included in a personal information capsule held in personal information holding means 25 and based on the contract policy stored in transmission policy holding means 201.

Each of contract checking means 202 and information extraction means 203 is specifically implemented by the CPU of an information processing apparatus which operates in accordance with a program. Contract checking means 202 comprises a function of integrating contract information included in a personal information capsule with a contract policy included in a transmission policy stored in transmission policy holding means 201.

In addition, contract checking means 202 comprises a function of creating information for concluding a contract with personal information utilization apparatus 3 (called an "inter-apparatus contract policy"). Specifically, in the second embodiment, contract checking means 202 generates information on limitations to the utilization of personal information forwarded to a destination, based on the transmission policy preserved by transmission policy holding means 201. In the second embodiment, contract checking means 202 checks contract information included in a personal information capsule against a contract policy included in a transmission policy.

Contract checking means 202 also extracts information which matches information included in the contract information from among information included in the contract policy. Then, contract checking means 202 generates an inter-apparatus contract policy including the extracted information.

Information extraction means 203 comprises functions of checking personal information elements included in a personal information capsule against a data transmission policy included in a transmission policy stored in transmission policy holding means 201 to extract elements which can be to extract elements which can be presented to a destination from among the personal information elements included in the personal information capsule.

Specifically, information extraction means 203 extracts information which is to be transmitted to the destination from among information included in the personal information based on the personal information included in the personal information capsule and the transmission policy preserved by transmission policy holding means 201. Information extraction means 203 also comprises a function of creating information on the extracted personal information elements which can be presented to a destination from among personal information elements in a list form.

Basic functions of the components in personal information utilization apparatus 4 contract combination means 202, and information extraction means 203 are similar to those functions shown in the first embodiment, except for transmission policy holding means 201.

As illustrated in FIG. 5, personal information utilization apparatus 3 comprises personal information requesting means 31, reception negotiation means 32, negotiation result recording means 33, reception means 34, and personal information holding means 35. In the second embodiment, personal information requesting means 31, reception negotiation means 32, negotiation result recording means 33, reception means 34, and personal information holding means 35 are similar in function to personal information requesting means 21, reception negotiation means 22, negotiation result recording means 23, reception means 24, and personal information holding means 25, respectively.

Next, the operation will be described. In the second embodiment, operations involved in concluding a personal information utilization contract between personal information utilization apparatus 4 and personal information generation apparatus 1, transmitting/receiving a personal information capsule, and registering the personal information capsule in personal information holding means 25 are similar to the operations shown in the first embodiment.

The first embodiment showed an example in which a personal information capsule received by personal information utilization apparatus 2 is utilized by personal information utilization unit 29 residing within personal information utilization apparatus 2, whereas in the second embodiment, personal information is utilized by personal information utilization apparatus 3 which is an apparatus external to personal information utilization apparatus 4. FIG. 6 is a flow diagram illustrating an exemplary process for distributing personal information from personal information utilization apparatus 4 to another personal information utilization apparatus 3.

Reception negotiation means 32 of personal information utilization apparatus 3 extracts a personal information reception policy stored in personal information requesting means 31, and creates a request message for requesting personal information managed by personal information utilization apparatus 4 based on the extracted personal information policy (step S201).

Reception negotiation means 32 then transmits the created request message to personal information utilization apparatus 3 through a communications network (step S202). In this event, personal information utilization apparatus 3 transmits the request message in accordance with a process similar to that performed by personal information utilization apparatus 2 in the first embodiment.

Transmission negotiation means 26 receives the request message from reception negotiation means 32 through the communications network (step S203).

Transmission negotiation means 26 also instructs personal information extraction means 203, based on the received message, to extract personal information which can be transmitted (step S204).

Personal information extraction means 203 extracts a personal information capsule from personal information holding means 25 and extracts a transmission policy related to data transmission from transmission policy holding means 201. Information extraction means 203 extracts elements of personal information which may be transmitted to personal information utilization apparatus 3 based on the two types of information, i.e., the extracted personal information capsule and transmission policy. Then, information extraction means 203 passes the extracted elements of the personal information to transmission negotiation means 26.

Simultaneous to the instruction made to personal information extraction means 203 to extract personal information, transmission negotiation means 26 receives information (inter-apparatus contract policy) which is based for generate information on a contract with personal information utilization apparatus 3 from contract combination means 202.

This information which is based for generate the contract information is a transmission policy which is utilized when personal information utilization apparatus 4 forwards personal information that is based on contract information included in a personal information capsule and a transmission policy that is defined by personal information utilization apparatus 3. Transmission negotiation means 26 executes processing for extracting information included in the transmission policy defined by utilization apparatus 3, which matches information included in the contract information of the personal information capsule.

To perform a policy checking process, contract checking means 202 extracts a personal information capsule from personal information holding means 25, and extracts a policy (contract policy included in the transmission policy) that is related to a contract from transmission policy holding means 201.

Contract checking means 202 also generates a list (inter-apparatus contract policy) which enumerates purposes for utilizing personal information which can be transmitted to personal information utilization apparatus 3 and to apparatuses to which the utilization is permitted, based on the contract information included in the personal information capsule and the contract policy.

Transmission negotiation means 26 determines a personal information utilization contract with reception negotiation means 32 based on the inter-apparatus contract policy from contract checking means 202 and the personal information extracted from personal information extraction means 203.

In this event, transmission negotiation means 26 checks the inter-apparatus contract policy against the personal information reception policy in the request message received from personal information utilization apparatus 3 (step S205).

Transmission negotiation means 26 also determines, based on the result of the check, whether or not the request message is acceptable (step S206).

In the negotiation process performed between transmission negotiation means 13 and reception negotiation means 22, the transmission side (personal information generation apparatus 1) determines information (personal information transmission policy) which is based for generate contract information defined by a personal information producer.

On the other hand, in a negotiation process performed between transmission negotiation means 26 and reception negotiation means 32, the transmission side determines information (transmission policy) which is basis of generate the contract information, on the basis of information which has been previously held in personal information holding means 25 and transmission policy holding means 201.

When it is determined at step S206 that the request message is acceptable, personal information utilization apparatus 4 generates a personal information capsule which is transmitted to personal information utilization apparatus 3 (steps S207-S208).

Then, personal information utilization apparatus 3 receives the personal information capsule which is preserved in personal information holding means 35 (steps S209-S211).

The process from step S207 to step SS11 is similar to the process from step S107 to step S111 which is executed between personal information generation apparatus 1 and personal information utilization apparatus 2 illustrated in the first embodiment.

On the other hand, when it is determined that the request message is not acceptable, personal information utilization apparatus 4 creates an error message which is transmitted to personal information utilization apparatus 3 (step S212).

Then, personal information utilization apparatus 3 determines whether or not a new request message can be created, and transmits another request message or terminates the process without further action, based on the result of the determination (steps S213, S214). The process from step S212 to step S214 is similar to the process from step S112 to step S114 executed between personal information generation apparatus 1 and personal information utilization apparatus 2 illustrated in the first embodiment.

As described above, according to the second embodiment, negotiations are conducted in regard to the transmission of personal information between personal information utilization apparatuses as well. Then, personal information is distributed between the personal information utilization apparatuses only when an agreement is established in regard to the utilization of personal information between the personal information utilization apparatuses. Accordingly, personal information can be safely distributed between personal information utilization apparatuses as well.

Third Embodiment

Next, a third embodiment of the present invention will be described with reference to FIGS. 7 and 8.

Figure 7:
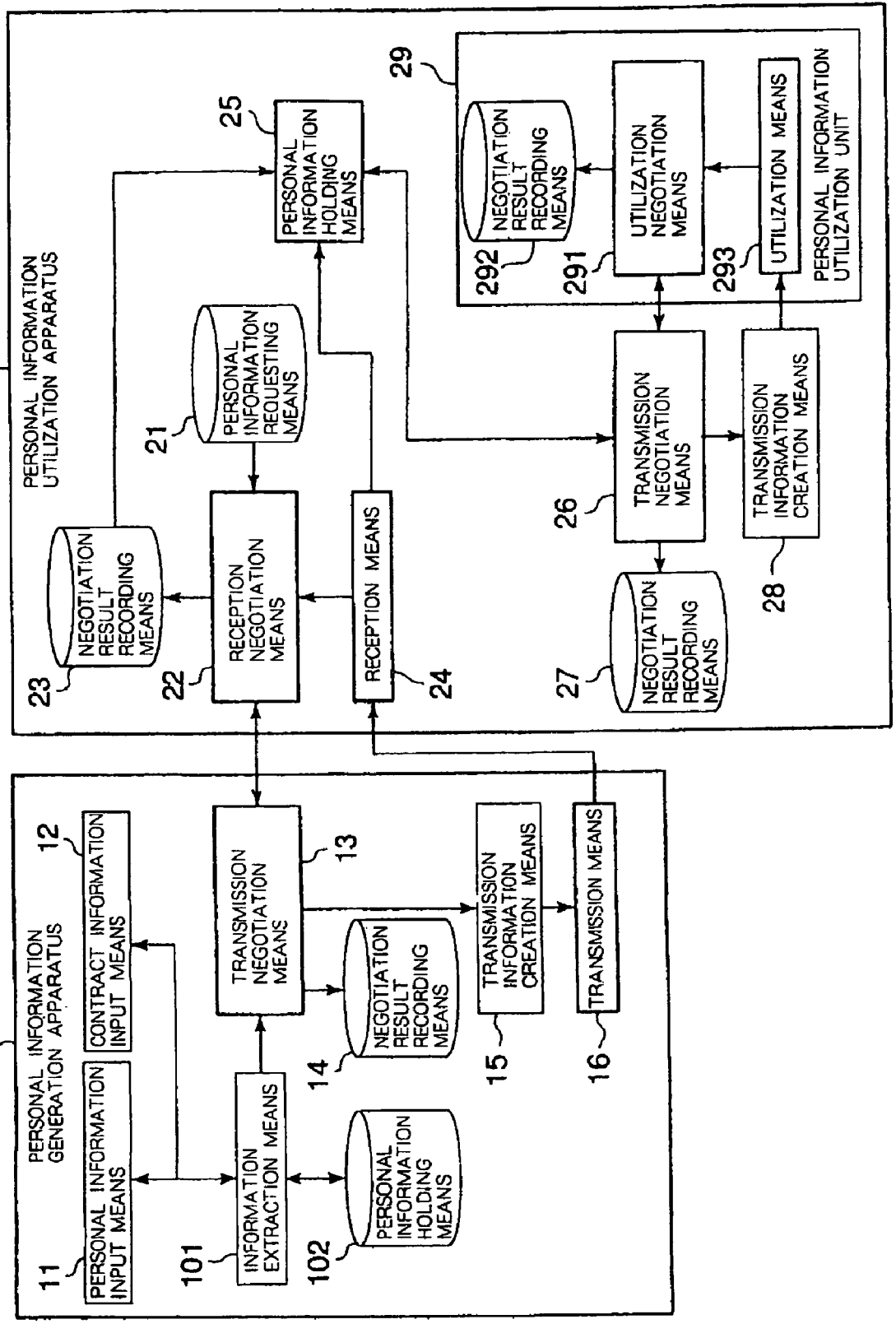
FIG. 7 is a block diagram illustrating a further exemplary configuration of the personal information distribution management system.
Figure 8:
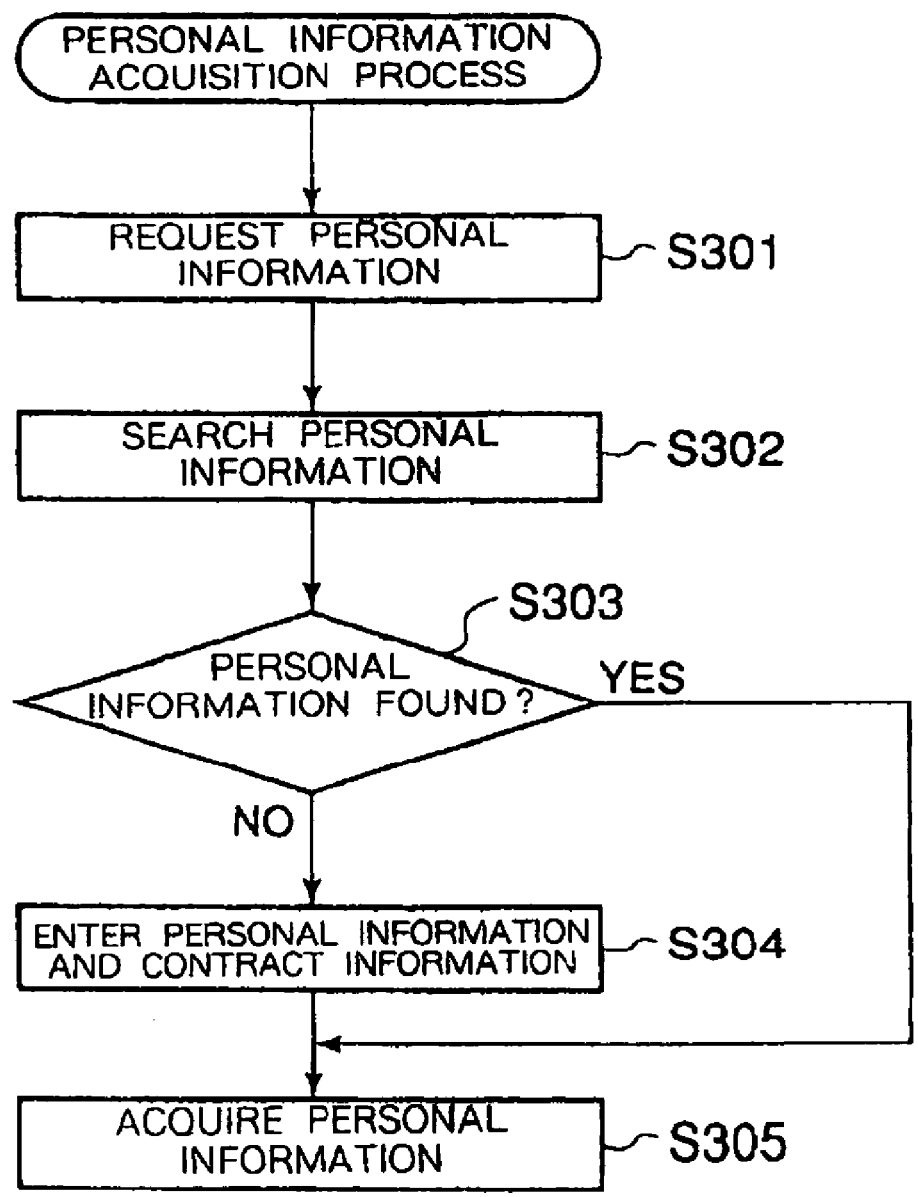
FIG. 8 is a flow diagram illustrating an exemplary personal information acquisition process through which personal information generation apparatus 5 acquires personal information upon receipt of a request message.

FIG. 7 is a block diagram illustrating a further exemplary configuration of the personal information distribution management system. As illustrated in FIG. 7, in the third embodiment, the personal information distribution management system comprises personal information generation apparatus 5 and personal information utilization apparatus 2.

Personal information generation apparatus 5 and personal information utilization apparatus 2 are interconnected through a communications network, for example, the Internet or the like. While FIG. 7 shows one personal information generation apparatus 5, the personal information distribution management system may include a plurality of personal information generation apparatuses 5.

The first embodiment has been described in connection with a scenario where, upon receipt of a message for requesting personal information from personal information utilization apparatus 2, personal information generation apparatus 5 receives personal information and a personal information transmission policy in accordance with instructions entered by the user.

In the third embodiment, personal information generation apparatus 5 previously stores personal information and a personal information transmission policy in a storage device. Then, upon receipt of a message for requesting personal information, personal information generation apparatus 5 extracts the previously stored personal information and personal information transmission policy to execute an associated process.

As illustrated in FIG. 7, the third embodiment differs from the first embodiment in that personal information utilization apparatus 5 includes information extraction means 101 and personal information holding means 102 in addition to the components of personal information utilization apparatus 1 in the first embodiment illustrated in FIG. 2.

Information extraction means 101 is specifically implemented by the CPU of an information processing apparatus which operates in accordance with a program. Information extraction means 101 comprises a function of acquiring elements of personal information and contract conditions (personal information transmission policy) corresponding to that personal information. In this event, information extraction means 101 determines whether or not the personal information and personal information transmission policy have been previously stored in personal information holding means 102.

When personal information has been previously registered in personal information generation apparatus 5 by a personal information producer, information extraction means 101 extracts the personal information and personal information transmission policy from personal information holding means 102.

On the other hand, when the personal information has not been registered in personal information generation apparatus 5 by the personal information producer, information extraction means 101 receives the personal information and personal information transmission policy entered through personal information input means 11 and contract information input means 12, respectively, in accordance with instructions entered by the personal information producer.

Personal information holding means 102 is specifically implemented by a storage device such as a magnetic disk drive. Personal information holding means 102 previously resisters (preserves) personal information entered in accordance with instructions entered by a personal information producer and a personal information transmission policy corresponding to that personal information.

In the third embodiment, components of personal information generation apparatus 5, except for information extraction means 101 and personal information holding means 102, are similar in function to those shown in the first embodiment. Likewise, personal information utilization apparatus 2 is similar in function to personal information utilization apparatus 2 shown in the first embodiment.

Next, the operation will be described. In the third embodiment, a process performed by personal information generation apparatus 5 for acquiring personal information upon receipt of a request message from personal information utilization apparatus 2, differs from the personal information acquisition process in the first embodiment. FIG. 8 is a flow diagram illustrating an exemplary personal information acquisition process through which personal information generation apparatus 5 acquires personal information.

First, personal information generation apparatus 5 receives a request message from personal information utilization apparatus 2 in accordance with a process similar to that from step S101 to step S103 shown in the first embodiment. In response, transmission negotiation means 13 requests information extraction means 101 for personal information and a transmission policy corresponding to the personal information (step S301).

Information extraction means 101 first searches personal information holding means 102 (step S302) to determine whether or not the personal information and personal information transmission policy have previously been stored in personal information holding means 102 (step S303). Upon determining that the personal information and personal information transmission policy exist in personal information holding means 102, information extraction means 101 transitions to processing at step S305, just as it is, without executing processing at step S304.

Then, information extraction means 101 extracts a personal information capsule from personal information holding means 102 (step S305) and passes the extracted personal information capsule to transmission negotiation means 13.

Upon determining at step S303 that neither personal information nor personal information transmission policy is stored in personal information holding means 102, information extraction means 101 prompts the user to enter personal information and a transmission policy corresponding to the personal information by displaying a request for entering personal information on a display device or the like.

In this event, personal information input means 11 and contract information input means 12 receive the personal information and personal information transmission policy, respectively, in accordance with instructions entered by the user (step S304).

Then, information extraction means 101 is supplied with the personal information and personal information transmission policy from personal information input means 11 and contract information input means 12, respectively (step S305), and passes the information entered by the user to transmission negotiation means 13.

In the third embodiment, personal information generation apparatus 5 generates a personal information capsule for transmission to personal information utilization apparatus 2, and returns an error message to personal information utilization apparatus 2 through a process which is similar to the process from step S105 to step S114 shown in the first embodiment. Also, in the third embodiment, as transmission information creation means 15 creates a personal information capsule, the personal information capsule is stored in personal information holding means 102 before it is transmitted to personal information utilization apparatus 2 by transmission means 16.

As described above, according to the third embodiment, personal information generation apparatus 5 previously stores and manages personal information. Then, personal information generation apparatus 5 conducts negotiations with personal information utilization apparatus 2 in regard to the transmission of personal information using the information held in personal information holding means 102. Thus, personal information generation apparatus 5 can safely, flexibly and rapidly distribute the personal information previously stored therein.

Fourth Embodiment

Next, a fourth embodiment of the present invention will be described with reference to FIGS. 9 and 10.

Figure 9:
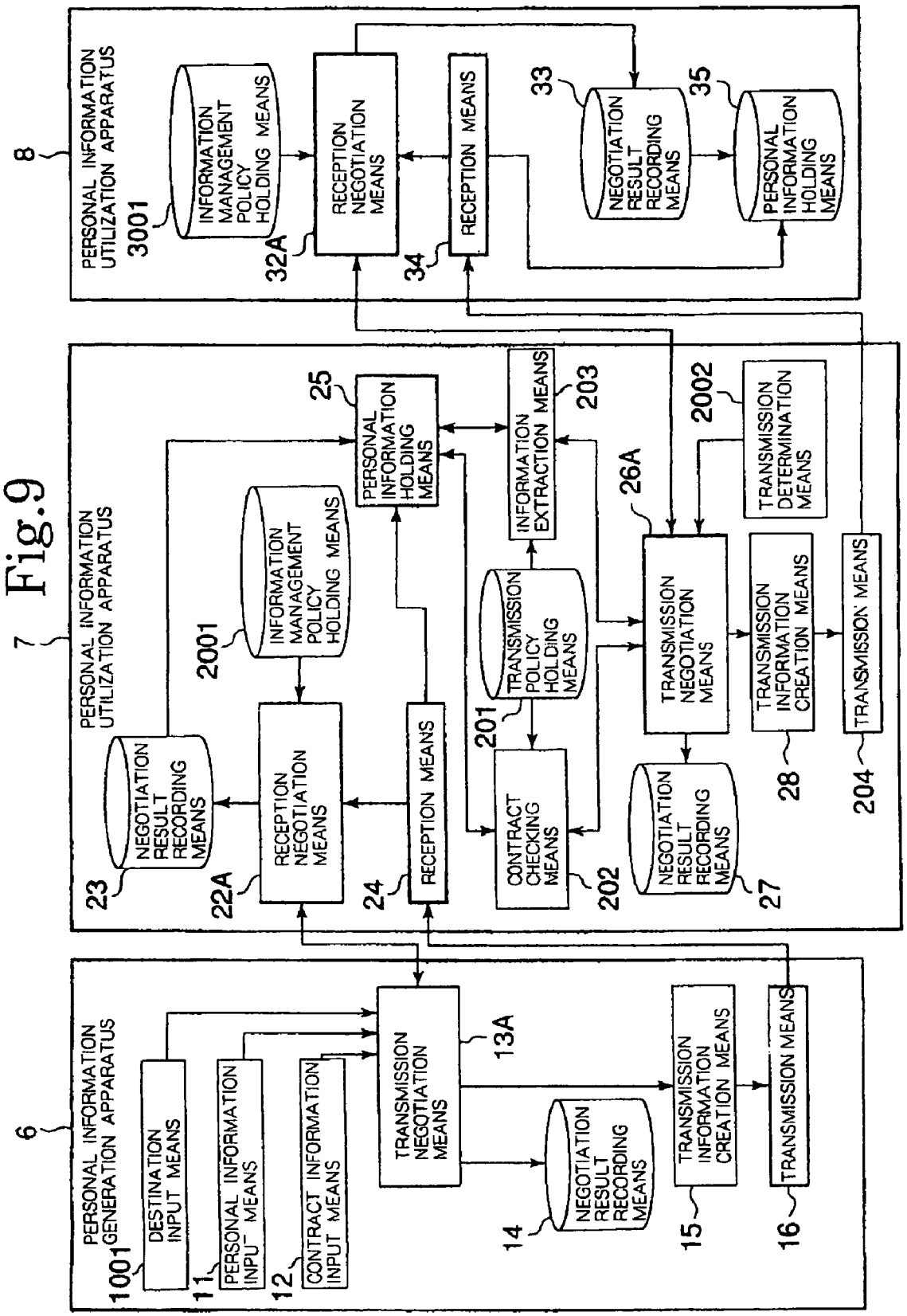
FIG. 9 is a block diagram illustrating yet a further exemplary configuration of the personal information distribution management system.
Figure 10:
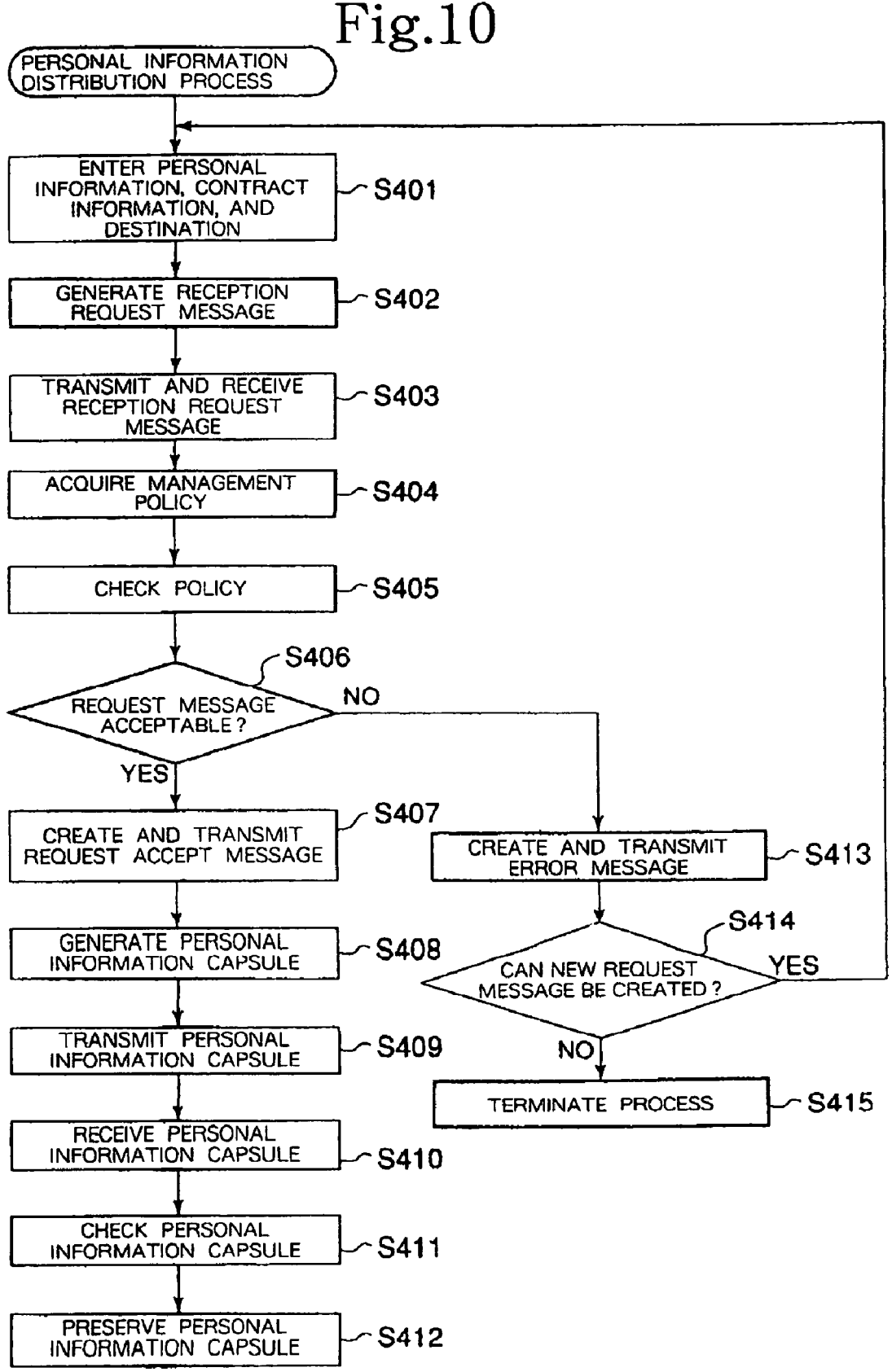
FIG. 10 is a flow diagram illustrating another exemplary process for distributing and managing personal information between a personal information generation apparatus and a personal information utilization apparatus.

FIG. 9 is a block diagram illustrating yet a further exemplary configuration of the personal information distribution management system. As illustrated in FIG. 9, in the fourth embodiment, the personal information distribution management system comprises personal information generation apparatus 6 and two personal information utilization apparatuses 7, 8. Personal information generation apparatus 6 and each personal information utilization apparatus 7, 8 are interconnected through a communications network, for example, LAN, the Internet or the like.

The first to third embodiments have been described in connection with a scenario where personal information is transmitted from a personal information generation apparatus to a personal information utilization apparatus in response to a request from the personal information utilization apparatus. The fourth embodiment will be described in connection with a scenario where, after personal information has been once distributed from the personal information generation apparatus to the personal information utilization apparatus, the personal information utilization apparatus updates the personal information in response to a request from the personal information generation apparatus when an update must be made to the personal information held in the personal information utilization apparatus.

As illustrated in FIG. 9, the fourth embodiment differs from the second embodiment in that personal information utilization apparatus 6 comprises destination input means 1001 in addition to the components of personal information utilization apparatus 1 in the second embodiment illustrated in FIG. 5.

The fourth embodiment also differs from the second embodiment in that personal information utilization apparatus 7 comprises information management policy holding means 2001 and transmission determination means 2002 in addition to the components of personal information utilization apparatus 4 in the second embodiment illustrated in FIG. 5.

The fourth embodiment further differs from the second embodiment in that personal information utilization apparatus 8 comprises information management policy holding means 3001 in addition to the components of personal information utilization apparatus 3 in the second embodiment illustrated in FIG. 5. Furthermore, in the fourth embodiment, transmission negotiation means 13A, reception negotiation means 22A, transmission negotiation means 26A, and reception negotiation means 32A differ in function from their counterparts shown in the second embodiment.

Destination input means 1001 is specifically implemented by the CPU of an information processing apparatus which operates in accordance with a program and an input device such as a mouse, a keyboard or the like.

Destination input means 1001 comprises a function of receiving designation information (for example, identification information such as an IP address) for designating an apparatus to which a personal information capsule is transmitted in accordance with instructions entered by a personal information producer.

Specifically, destination input means 1001 receives the destination to which personal information is to be transmitted in accordance with manipulations of the personal information producer. In the fourth embodiment, when personal information must be updated after the personal information has once been distributed to personal information utilization apparatus 7, destination input means 1001 receives information for designating a personal information utilization apparatus to which a personal information capsule should be transmitted in accordance with instructions entered by the personal information producer.

Also, in the fourth embodiment, transmission negotiation means 13A comprises a function of generating a reception request message for requesting the reception of updated personal information, based on a personal information transmission policy entered through contract information input means 12.

Transmission negotiation means 13A also comprises a function of transmitting the generated reception request message to personal information utilization apparatus 7 through the communications network. Transmission negotiation means 13A further comprises a function of generating contract information based on the result of the check received from reception negotiation means 22A.

Information management policy holding means 2001 is specifically implemented by a storage device such as a magnetic disk drive. Information management policy holding means 2001 previously stores a policy indicative of conditions for receiving and managing a personal information capsule (called the "information management policy") when reception negotiation means 22A receives a request for receiving a personal information capsule (reception request message) from personal information generation apparatus 6.

Specifically, in the fourth embodiment, information management policy holding means 2001 previously stores limitation information indicative of limitations to the reception of personal information. The information management policy previously stored in information management policy holding means 2001 has been previously created, for example, by a manager who manages personal information utilization apparatus 7 and is stored in information management policy holding means 2001.

Also, in the fourth embodiment, reception negotiation means 22A comprises a function of extracting an information management policy from information management policy holding means 2001 upon receipt of a reception request message from personal information generation apparatus 6.

Reception negotiation means 22A also comprises a function of checking a personal information transmission policy of a reception request message against the extracted information management policy. Reception negotiation means 22A further comprises a function of transmitting the result of checking the personal information transmission policy against the information management policy to transmission negotiation means 13A through the communications network.

Transmission determination means 2002 is specifically implemented by the CPU of an information processing apparatus which operates in accordance with a program. Transmission determination means 2002 comprises a function of determining to which personal information utilization apparatus 8 personal information utilization apparatus 7 re-distributes a personal information capsule. Transmission determination means 2002 performs this redistribution destination determination process, thereby determining the destination of the personal information, and the personal information capsules that are to be transmitted.

In other words, in the fourth embodiment, transmission determination means 2002 determines whether or not personal information should be forwarded to personal information utilization apparatus 8 different from personal information utilization apparatus 7, and determines a destination to which the personal information is forwarded.

In the fourth embodiment, transmission negotiation means 26A comprises a function of generating an inter-apparatus reception request message for requesting personal information utilization apparatus 8 to receive updated personal information, based on an inter-apparatus policy generated by contract checking means 202.

Transmission negotiation means 26A also comprises a function of transmitting the generated inter-apparatus reception request message to personal information utilization apparatus 8 through the communications network.

Transmission negotiation means 26A further comprises a function of generating inter-apparatus contract information based on the result of the check received from reception negotiation means 32A.

Information management policy holding means 3001 is specifically implemented by a storage device such as a magnetic disk drive. Information management policy holding means 3001 previously stores a policy indicative of conditions for receiving and managing a personal information capsule (information management policy) when reception negotiation means 32A receives an inter-apparatus reception request message from personal information utilization apparatus 7.

The information management policy previously stored in information management policy holding means 3001 has been previously created by a manager who manages personal information utilization apparatus 8 and is stored in information management policy holding means 3001.

Also, in the fourth embodiment, reception negotiation means 32A comprises a function of extracting an information management policy from information management policy holding means 3001 upon receipt of an inter-apparatus reception request message from personal information utilization apparatus 7.

Reception negotiation means 32A also comprises a function of checking the personal information transmission policy of an inter-apparatus reception request message against the extracted information management policy. Reception negotiation means 32A further comprises a function of transmitting the result of checking the personal information transmission policy against the information management policy to transmission negotiation means 26A through the communications network.

In the fourth embodiment, basic functions of the components in personal information generation apparatus 6 are similar to the functions of their counterparts shown in the second embodiment, except for destination input means 1001 and transmission negotiation means 13A.

Likewise, basic functions of the components in personal information utilization apparatus 7 are similar to the functions of their counterpart shown in the second embodiment, except for information management policy holding means 2001, reception negotiation means 22A, transmission negotiation means 26A, and transmission determination means 2002.

Further, basic functions of the components in personal information utilization apparatus 8 are similar to the functions of their counterparts shown in the second embodiment, except for information management policy holding means 3001 and reception negotiation means 32A.

Next, the operation will be described. FIG. 10 is a flow diagram illustrating another exemplary process for distributing and managing personal information between the personal information generation apparatus and personal information utilization apparatus.

First, personal information input means 11 and contract information input means 12 receive transmission policies (personal information transmission policies) for defining personal information and contract information, respectively, in accordance with instructions entered by a personal information producer. In this event, in the fourth embodiment, personal information input means 11 receives updated personal information.

Destination input means 1001 receives designation information (also called the "destination information") for designating a utilization apparatus to which personal information is transmitted, in accordance with instructions entered by the personal information producer (step S401).

Alternatively, the destination to which personal information is transmitted, may not be received by destination input means 1001 in accordance with instructions entered by the personal information producer, but may be automatically determined by personal information generation apparatus 6. In this event, for example, personal information generation apparatus 6 may store identification information of personal information utilization apparatuses to which personal information capsules have been transmitted in the past, determine a destination in accordance with the stored identification information, and generate destination information.

This destination information is information different from information on available apparatuses (distribution range) described in a personal information transmission policy, and is information for specifying an apparatus to which personal information generation apparatus 6 directly transmits personal information.

When a transmission policy is entered for defining destination information, updated personal information, and contract information, transmission negotiation means 13A creates a reception request message for requesting personal information utilization apparatus 7 to receive personal information (step S402). Then, transmission negotiation means 13 transmits the generated reception request message to personal information utilization apparatus 7 through the communications network. Reception negotiation means 22A of personal information utilization apparatus 7 in turn receives the reception request message from personal information generation apparatus 6 (step S403).

Upon receipt of the reception request message, reception negotiation means 22A extracts an information management policy from information management policy holding means 2001 (step 404). In the fourth embodiment, the information management policy is a policy which defines elements of personal information that can be maintained by personal information utilization apparatus 7, and a purpose for utilizing the personal information. The information management policy has been previously set by a manager of personal information utilization apparatus 7 and is stored in information management policy holding means 2001.

Reception negotiation means 22A checks the extracted information management policy against the contents of the received reception request message (personal information transmission policy) (step S405). In this event, reception negotiation means 22A determines, based on the result of the check, whether or not the reception request message is acceptable (step S406).

Upon determining that the reception request message is acceptable, reception negotiation means 22A creates a message for communicating that the request is acceptable. Then, reception negotiation means 22A transmits the created message to personal information generation apparatus 6 through the communications network (step S407).

Upon receipt of the message from personal information utilization apparatus 7, personal information negotiation means 13A generates contract information based on the personal information transmission policy. Transmission negotiation means 13A also registers the transmission policy and the generated contract information in negotiation result recording means 23. Transmission information creation means 15 in turn creates a personal information capsule based on the contract information (step S408).

Personal information generation apparatus 6 transmits the generated personal information capsule to personal information utilization apparatus 7 (step S709) while personal information utilization apparatus 7 receives the personal information capsule for preservation therein (steps S410-S412).

As can be appreciated, the process for transmitting the information capsule from personal information generation apparatus 6 to personal information utilization apparatus 7 for preservation is similar to the process from step S108 to step S111 shown in the first embodiment.

On the other hand, upon determining at step S406 that the reception request message is not acceptable, reception negotiation means 22A creates a message (notification message) for communicating that the request is not acceptable. Then, reception negotiation means 22A transmits the created message to personal information generation apparatus 6 through the communications network (step S413).

Upon receipt of the message, transmission negotiation means 13A of personal information generation apparatus 6 determines whether or not a reception request message can be newly created (step S414). For example, transmission negotiation means 13A prompts the user to enter a new destination and transmission policy by displaying on a display device that the entry of personal information has been rejected. Then, as the user enters instructions for a new destination and transmission policy, transmission negotiation means 13A determines that a new reception request message can be created.

When it is determined that a new reception request message can be created, personal information generation apparatus 6 again returns to processing at step S401 to repeatedly execute processing at step S401 onward. When it is determined that a new reception message cannot be created, personal information generation apparatus 6 terminates the process without further actions (step s415).

As described above, according to the fourth embodiment, a destination can be entered using destination input means 1001, and the transmission of personal information can be determined in accordance with a request from personal information generation apparatus 6. Therefore, personal information generation apparatus 6 can distribute personal information to a personal information utilization apparatus based on its own information management policy and contract information, instead of passively waiting for a request for transmitting personal information from another personal information utilization apparatus.

Fifth Embodiment

Next, a fifth embodiment of the present invention will be described with reference to FIG. 11.

Figure 11:
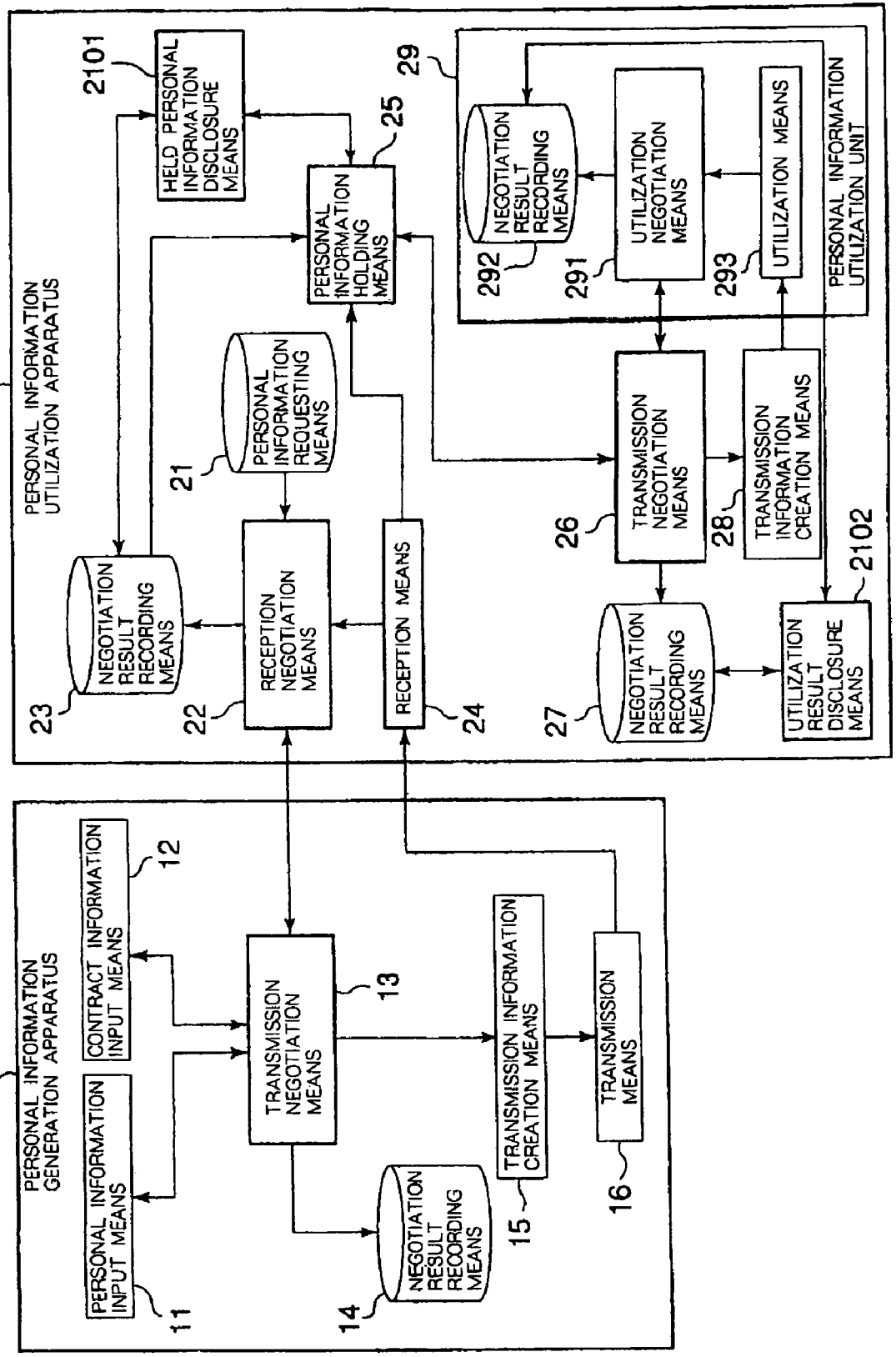
FIG. 11 is a block diagram illustrating a still further exemplary configuration of the personal information distribution management system.

FIG. 11 is a block diagram illustrating still a further exemplary configuration of the personal information distribution management system. As illustrated in FIG. 11, in the fifth embodiment, the personal information distribution management system comprises personal information generation apparatus 1 and personal information utilization apparatus 9. Personal information generation apparatus 1 and personal information utilization apparatus 9 are interconnected, for example, through a communications network such as the Internet.

As illustrated in FIG. 11, the fifth embodiment differs from the first embodiment in that personal information utilization apparatus 9 comprises held personal information disclosure means 2101 and utilization result disclosure means 2102 in addition to the components of personal information utilization apparatus 2 in the first embodiment illustrated in FIG. 2.

Held personal information disclosure means 2102 is specifically implemented by the CPU of an information processing apparatus which operates in accordance with a program, and is implemented by a network interface unit. Held personal information disclosure means 2101 comprises a function of presenting personal information managed by personal information holding means 25 to a personal information producer based on a request from the personal information producer. In other words, in the fifth embodiment, held personal information disclosure means 2101 discloses a personal information capsule preserved by personal information holding means 25 to personal information generation apparatus 1.

Specifically, held personal information disclosure means 2101 extracts personal information from personal information holding means 25 and transmits the extracted personal information to personal information generation apparatus 1 through the communications network in response to a request from personal information generation apparatus 1. Held personal information disclosure means 2101 also extracts information on a history of negotiations between transmission negotiation means 13 and reception negotiation means 22 from negotiation result recording means 23 in response to a request from personal information generation apparatus 1.

Then, held personal information disclosure means 2101 transmits the extracted history information to personal information generation apparatus 1 through the communications network. In response, personal information generation apparatus 1 transmits the received personal information and history information to the personal information producer by displaying them on a display device.

Utilization result disclosure means 2102 is specifically implemented by the CPU of an information processing apparatus which operates in accordance with a program, and is implemented by a network interface unit. Utilization result disclosure means 2102 comprises a function of transmitting a personal information utilization history managed by negotiation result recording means 27 or negotiation result recording means 292 to the personal information producer based on a request from the personal information producer.

In other words, in the fifth embodiment, utilization result disclosure means 2102 discloses processing results preserved by negotiation result recording means 27 or negotiation result recording means 292 to personal information generation apparatus 1.

Specifically, utilization result disclosure means 2102 extracts a personal information utilization history from negotiation result recording means 27 or negotiation result recording means 292, and transmits the extracted personal information utilization history to personal information generation apparatus 1 through the communications network in response to a request from personal information generation apparatus 1. Then, personal information generation apparatus 1 transmits the received personal information utilization history to the personal information producer by displaying it on a display device.

As described above, according to the fifth embodiment, the personal information producer can confirm a personal information utilization situation and management situation using held personal information disclosure means 2101 and utilization result disclosure means 2102. Accordingly, it is possible to give a sense of security to an individual who is both the owner of personal information (personal information producer) and the personal information utilization apparatus which manages the personal information.

Sixth Embodiment

Next, a sixth embodiment of the present invention will be described with reference to FIG. 12.

Figure 12:
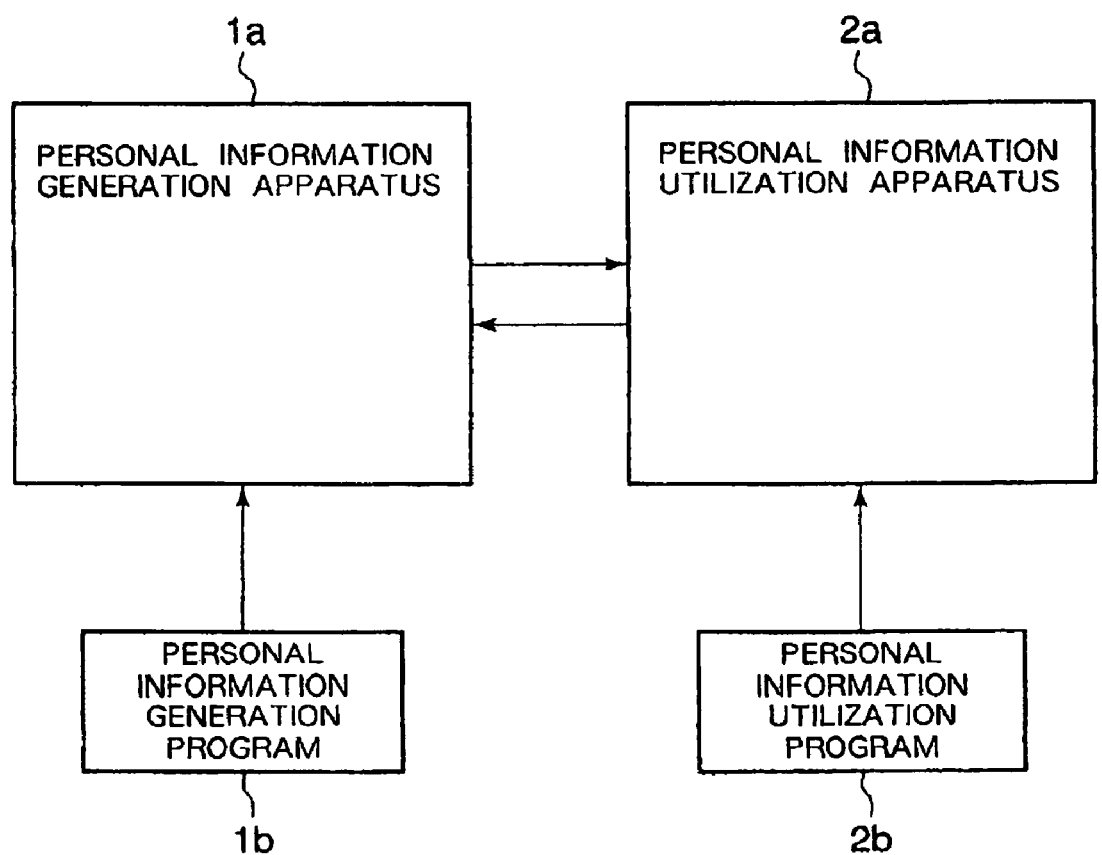
FIG. 12 is a block diagram illustrating a further exemplary configuration of the personal information distribution management system.

FIG. 12 is a block diagram illustrating a further exemplary configuration of the personal information distribution management system. As illustrated in FIG. 12, in the sixth embodiment, the personal information distribution management system comprises personal information generation apparatus 1a and personal information utilization apparatus 2a. Personal information generation apparatus 1a and personal information utilization apparatus 2a are interconnected through a communications network, for example, the Internet or the like.

Personal information generation apparatus 1a is an information processing apparatus such as a workstation, personal computer or the like. In the sixth embodiment, personal information generation apparatus 1a reads, for example, personal information generation program 1b for generating and providing personal information from a recording medium (for example, CD-ROM).

For example, personal information generation apparatus 1a reads personal information generation program (personal information service program) 1b which causes a computer to execute a process for receiving a reception policy indicative of reception conditions under which a personal information utilization apparatus, which wishes to utilize personal information, receives the personal information from the personal information utilization apparatus through a communications network; a process for checking a transmission policy, indicative of transmission conditions under which the personal information is transmitted to the personal information utilization apparatus, against the received reception policy to determine conditions for selecting personal information which can be provided to the personal information utilization apparatus; a process for selecting personal information in accordance with the determined selection conditions; and a process for transmitting the selected personal information to the personal information utilization apparatus through the communications network. Then, personal information generation apparatus 1a executes the processes in accordance with the read personal information generation program.

In the sixth embodiment, personal information generation apparatus 1a executes a process for conducting negotiations with personal information utilization apparatus 2a in regard to the utilization of personal information in accordance with personal information generation program 1b, and transmits a personal information capsule to personal information utilization apparatus 2a. Personal information generation apparatus 1a executes processes similar to those of any of personal information generation apparatuses 1, 5, 6 illustrated in the first to fifth embodiments in accordance with personal information generation program 1b.

Specifically, personal information utilization apparatus 2a is an information processing apparatus such as a workstation, personal computer or the like. In the sixth embodiment, personal information utilization apparatus 2a reads, for example, personal information utilization program 2b for executing processes for utilizing personal information from a recording medium.

For example, personal information utilization apparatus 2a reads a personal information utilization program to cause a computer to execute a process for transmitting a reception policy stored in reception policy storage means to a personal information service apparatus which provides personal information through a communications network; a process for receiving a personal information capsule from the personal information service apparatus through the communications network; and a process for preserving the received personal information capsule. Then, personal information utilization apparatus 2a executes the processes in accordance with the read personal information utilization program.

In the sixth embodiment, personal information utilization apparatus 2a executes a process for conducting negotiations with personal information generation apparatus 1a in regard to the distribution of personal information in accordance with personal information utilization program b2, receives a personal information capsule from personal information generation apparatus 1a, and makes personal information available. Personal information utilization apparatus 2a executes processes similar to those of any one of personal information utilization apparatuses 2, 3, 4, 7, 8, 9 illustrated in the first to fifth embodiments in accordance with personal information utilization program 2b.

Figure 13:
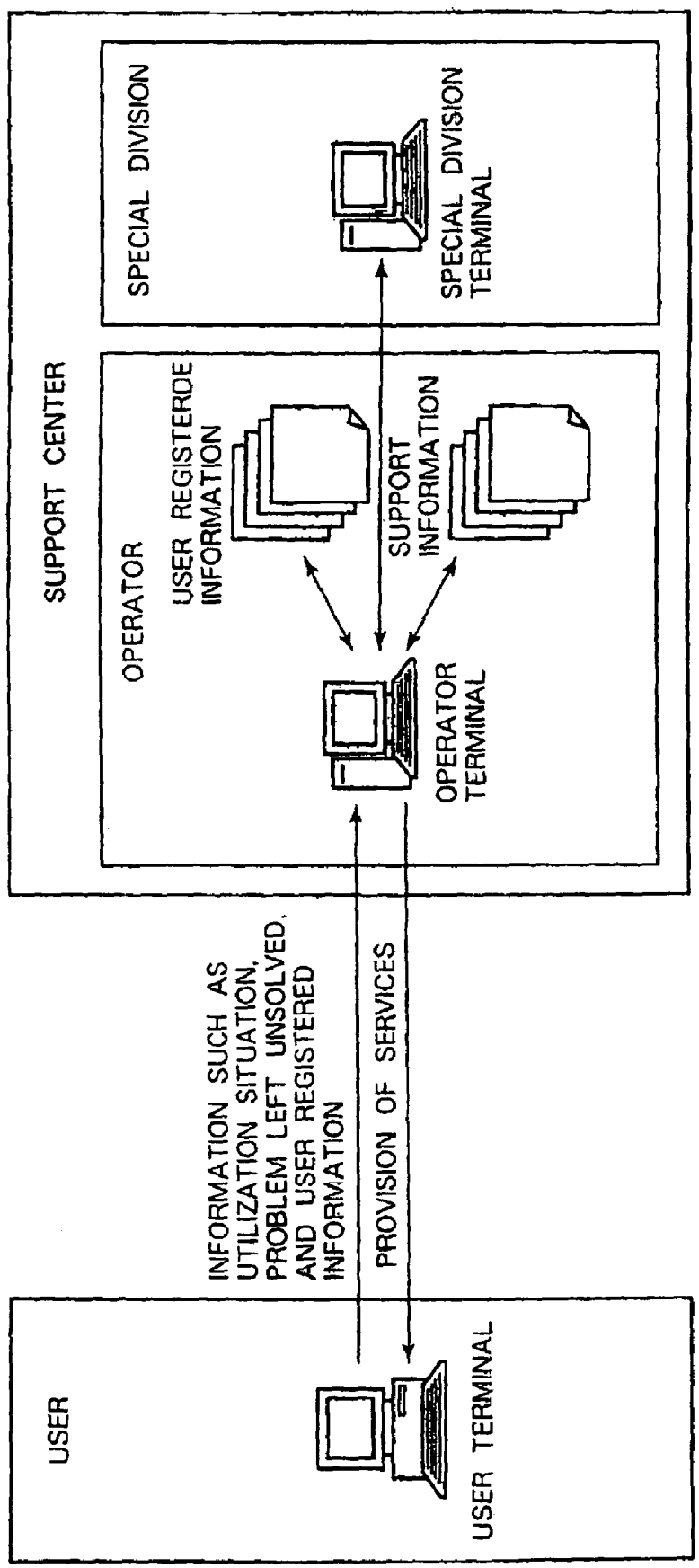
FIG. 13 is an explanatory diagram illustrating a specific example of the personal information distribution management system.

Next, an example of the present invention will be described with reference to FIG. 13. FIG. 13 is an explanatory diagram illustrating a specific example of the personal information distribution management system. The personal information distribution management system illustrated in FIG. 13 corresponds to any one of the personal information distribution management systems illustrated in the first to sixth embodiments.

As illustrated in FIG. 13, this example will be described in connection with a scenario where the personal information distribution management system is applied to a system for distributing personal information between a user and a support center. In this example, the user, an operator, and a special division (for example, a person in charge in a technical division for repair of devices and the like) handle personal information of the user, respectively. For example, the user provides his or her personal information capsule to the support center in order to request a service such as a repair of a personal computer (PC) or the like. Then, the support center provides the user with a repair service based on the personal information capsule.

As illustrated in FIG. 13, in this example, the personal information distribution management system comprises a user terminal, an operator terminal, and a special division terminal. In FIG. 13, the user terminal corresponds to the personal information generation apparatus. The operator terminal in turn corresponds to the personal information utilization apparatus. Further, the special division terminal corresponds to a personal information utilization apparatus different from the operator terminal.

First, the user terminal provides (transmits) a personal information capsule to the operator terminal in the support center in accordance with instructions entered by the user. For example, the user terminal transmits not only such information as the name, address, telephone number and the like of the user, but also information related to troubles found in the user's PC, as personal information.

The user terminal receives the personal information and a transmission policy in accordance with instructions entered by the user, and generates contract information between the user terminal and operator terminal. The user terminal generates a personal information capsule based on the received data and contract information, and transmits the personal information capsule to the operator terminal through a communications network.

The operator terminal receives the personal information capsule from the user terminal, and holds the received personal information capsule therein. Then, the operator terminal extracts the personal information from the personal information capsule to use in support of user businesses. The operator terminal also confirms, based on the contract information, that the purpose of utilizing the personal information complies with the contractual coverage, before utilization of the personal information is initiated.

For performing for use by user support businesses, the operator terminal checks the personal information against support information previously stored therein, for example, to determine whether or not the operator has the ability to proceed with the business. Upon determining that the operator has the ability to proceed with the business, the operator terminal provides a variety of services to the user in accordance with instructions entered by the operator.

Upon determining that the operator does not have the ability to cope with a problem left unsolved by the user as a result of a determination using the personal information, the operator terminal requests that the special division terminal provide a service in accordance with instructions entered by the operator.

In this event, the personal information is transmitted from the operator terminal and received by the special division terminal. When the operator terminal forwards the personal information of the user, the operator terminal forwards the personal information to the special division terminal in accordance with a transmission policy held by the operator terminal itself and in accordance with the contract information included in the personal information capsule. Also, when the personal information is forwarded to the special division terminal, the operator and special division create inter-apparatus contract information related to the personal information. Then, the operator terminal processes the personal information to be forwarded into a personal information capsule based on the created inter-apparatus contract information.

The special division terminal receives the personal information capsule from the operator terminal. The special division terminal also confirms the inter-apparatus contract information included in the personal information capsule to ascertain based on the inter-apparatus contract information whether or not the personal information is available to the special division. Upon determining that the personal information is available to the special division, the special division terminal provides a service to the user, by utilizing the personal information, in accordance with instructions entered by the person in charge of the special division.

When the personal information is updated after the personal information has been distributed from the user terminal to the operator terminal, the user terminal receives the updated personal information and destination information in accordance with instructions entered by the user. The user terminal also transmits the updated personal information to the operator terminal specified by the destination information in accordance with the result of negotiations conducted between the user terminal and operator terminal. In response, the operator terminal updates the personal information held therein based on the received information.

According to the present invention, the personal information distribution management system can be applied to applications where personal information is distributed from a user terminal to a server on a network in order to provide a service which requires the personal information. The personal information distribution management system can also be applied to applications where personal information is shared in a group which utilizes groupware or the like.

What is claimed is:

1. A personal information distribution management system comprising:
   a personal information service apparatus for providing a personal information capsule which includes personal information and handling conditions for handling said personal information; and
   a personal information utilization apparatus for utilizing personal information,
   wherein said personal information utilization apparatus includes:
   reception condition transmission means for transmitting a reception policy, indicative of reception conditions under which said personal information utilization apparatus receives personal information to, said personal information service apparatus through a communications network,
   personal information reception means for receiving the personal information capsule from said personal information service apparatus through the communications network;
   checking means for confirming conditions for handling of the personal information included in the personal information capsule which was received by the personal information reception means, in order to confirm limitations related to the utilization of the personal information; and said personal information service apparatus includes:
   selection condition determination means for checking a transmission policy, indicative of transmission conditions under which the personal information is transmitted to said personal information utilization apparatus, against the reception policy received from said personal information utilization apparatus to determine selection conditions for selecting personal information which is provided to said personal information utilization apparatus;
   personal information selecting means for selecting personal information in accordance with the selection conditions determined by said selection condition determination means,
   capsule generation means for generating a personal information capsule which encapsulates personal information together with the selection conditions; wherein
   said selection conditions include conditions for handling the personal information in accordance with the transmission policy, indicative of transmission conditions under which personal information is transmitted to said personal information utilization apparatus, and wherein the reception policy is received from said personal information utilization apparatus;
   said personal information determined in accordance with said selection conditions; and
   personal information transmission means for transmitting the personal information capsule generated by said capsule generation means to said personal information utilization apparatus through the communications network.

2. The personal information distribution management system according to claim 1, wherein said personal information utilization apparatus includes:
   reception policy storage means for previously storing a reception policy; and
   personal information capsule preservation means for preserving the personal information capsule received by said personal information reception means,
   wherein said reception policy transmission means transmits the reception policy stored in said reception policy storage means to said personal information service apparatus through the communications network.

3. The personal information distribution management system according to claim 2, wherein said personal information utilization apparatus includes:
   availability condition determination means for checking utilization conditions under which said personal information utilization apparatus utilizes the personal information against the selection conditions included in the personal information capsule preserved by said personal information capsule preservation means, and confirms to conditions for selecting available information defined by the personal information service apparatus which transmits said personal information capsule, to determine utilization conditions based on the confirmed conditions for selecting available information;
   available information selection means for selecting personal information included in the personal information capsule in accordance with the utilization conditions determined by said availability condition determination means; and
   personal information utilization means for utilizing the personal information selected by said available information selection means based on the selection conditions defined by the personal information service apparatus.

4. A personal information service apparatus for providing personal information in a personal information distribution management system for managing distribution of personal information, comprising:
   reception condition reception means for receiving a reception policy indicative of reception conditions under which a personal information utilization apparatus which utilizes personal information receives the personal information from a personal information service apparatus through a communications network;

selection condition determination means for checking a transmission policy, indicative of transmission conditions under which personal information is transmitted, to the personal information utilization apparatus, against the reception policy received by said reception condition reception means, to determine selection conditions for selecting personal information, so that said personal information is provided by said personal information service apparatus to said personal information utilization apparatus and so that said personal information available only under the selection conditions is confirmed by the personal information utilization apparatus;

personal information selecting means for selecting a personal information in accordance with the selection conditions determined by said selection condition determination means;

capsule generation means for generating a personal information capsule which encapsulates personal information together with the selection conditions; wherein said selection conditions include conditions for handling the personal information in accordance with the transmission policy, indicative of transmission conditions under which personal information is transmitted to said personal information utilization apparatus, and wherein the reception policy is received from said personal information utilization apparatus;

said personal information determined in accordance with said selection conditions; and personal information transmission means for transmitting the personal information capsule generated by said capsule generation means to said personal information utilization apparatus through the communications network.

5. A personal information distribution management method comprising the steps of:

a personal information utilization apparatus which utilizes personal information transmitting a reception policy, indicative of reception conditions under which said personal information utilization apparatus receives personal information, from a personal information service apparatus which provides personal information through a communications network;

said personal information service apparatus checks a transmission policy, indicative of transmission conditions under which personal information is transmitted to said personal information utilization apparatus, against the reception policy received from said personal information utilization apparatus, to determine selection conditions for selecting personal information, so that said personal information is provided by said personal information service apparatus to said personal information utilization apparatus and so that said personal information available only under the selection conditions is confirmed by the personal information utilization apparatus;

said personal information service apparatus selects personal information in accordance with the determined selection conditions; and said personal information service apparatus generates a personal information capsule which encapsulates personal information together with the selection conditions; wherein said selection conditions include conditions for handling the personal information in accordance with the transmission policy, indicative of transmission conditions under which personal information is transmitted to said personal information utilization apparatus, and wherein the reception policy is received from said personal information utilization apparatus;

said personal information determined in accordance with said selection conditions; and said personal information service apparatus transmitting the generated personal information capsule to said personal information utilization apparatus through the communications network.

6. A personal information service program embodied on a non-transitory computer-readable medium for providing personal information to a personal information utilization apparatus for utilizing the personal information, said program causing a computer to execute:

processing for receiving a reception policy indicative of reception conditions under which said personal information utilization apparatus receives personal information from said personal information service apparatus for utilizing the personal information through a communications network;

processing for checking a transmission policy, indicative of transmission conditions under which personal information is transmitted to said personal information utilization apparatus, against the received reception policy to determine selection conditions for selecting personal information, so that said personal information is provided by said personal information service apparatus to said personal information utilization apparatus and so that said personal information available only under the selection conditions is confirmed by the personal information utilization apparatus;

processing for selecting personal information in accordance with the determined selection conditions;

processing for encapsulating the selected personal information together with the determined selection conditions to generate a personal information capsule; and processing for transmitting the generated personal information capsule to said personal information utilization apparatus through the communications network.

7. A personal information service program embodied on a non-transitory computer readable medium for providing personal information to a personal information utilization apparatus for utilizing the personal information, said program causing a computer to execute:

processing for entering personal information to be distributed;

processing for entering a policy indicative of provisions related to the distribution of the personal information in accordance with instructions entered by a personal information producer;

processing for generating contract information for concluding a personal information utilization contract with a personal information utilization apparatus which is a destination of personal information, based on the entered personal information and the entered policy indicative of the provisions related to the distribution;

processing for preserving the generated contract information;

processing for encapsulating the personal information together with the contract information to generate a personal information capsule based on the generated contract information; and processing for transmitting the created personal information capsule to said personal information utilization apparatus through a communications network.

8. The personal information service program according to claim 7, further causing the computer to execute:

processing for previously storing the personal information entered by the personal information producer and storing a policy corresponding to the personal information entered by the personal information producer; and processing for searching preserved personal information and policies to extract personal information and a policy corresponding to the personal information based on a request.

9. The personal information service program according to claim 7, further causing the computer to execute:

processing for entering a destination of the personal information in accordance with instructions entered by the personal information producer; and processing for transmitting a personal information capsule to a personal information utilization apparatus which is the entered destination through the communications network.

* * * * *